United States Patent
Al-Yami et al.

(10) Patent No.: US 11,472,998 B2
(45) Date of Patent: Oct. 18, 2022

(54) CEMENT COMPOSITIONS INCLUDING EPOXY RESIN SYSTEMS FOR PREVENTING FLUID MIGRATION

(71) Applicant: Saudi Arabian Oil Company, Dhahran (SA)

(72) Inventors: Abdullah Al-Yami, Dhahran (SA); Vikrant Wagle, Abqaiq (SA); Zainab Alsaihati, Saihat (SA); Tushar Mukherjee, Udhailiyah (SA); Ali BinAli, Udhailiyah (SA); Ali Alqahtani, Udhailiyah (SA)

(73) Assignee: Saudi Arabian Oil Company, Dhahran (SA)

(*) Notice: Subject to any disclaimer, the term of this patent is extended or adjusted under 35 U.S.C. 154(b) by 181 days.

(21) Appl. No.: 16/515,673

(22) Filed: Jul. 18, 2019

(65) Prior Publication Data
US 2020/0071596 A1 Mar. 5, 2020

Related U.S. Application Data

(62) Division of application No. 16/117,974, filed on Aug. 30, 2018.

(51) Int. Cl.
*E21B 33/138* (2006.01)
*C09K 8/487* (2006.01)
*C09K 8/473* (2006.01)
*C09K 8/493* (2006.01)

(52) U.S. Cl.
CPC ............. *C09K 8/473* (2013.01); *C09K 8/487* (2013.01); *C09K 8/493* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 602,375 A | 4/1898 | Suydam | |
| 3,250,330 A * | 5/1966 | Smith, Jr. ............... | C09K 17/18 166/295 |
| 3,476,189 A | 11/1969 | Cornelis et al. | |
| 3,565,176 A | 2/1971 | Wittenwyler | |
| 3,646,999 A | 3/1972 | Hamby, Jr. et al. | |
| 3,915,232 A | 10/1975 | Gruesbeck | |
| 4,003,873 A | 1/1977 | Smith | |
| 4,042,032 A | 8/1977 | Anderson et al. | |
| 4,072,194 A | 2/1978 | Cole et al. | |
| 4,199,484 A | 4/1980 | Murphey | |
| 4,247,430 A | 1/1981 | Constien | |
| 4,665,988 A | 5/1987 | Murphey et al. | |
| 4,730,675 A | 3/1988 | Wygant et al. | |
| 4,749,042 A | 6/1988 | Wu | |
| 4,799,553 A | 1/1989 | Wu | |
| 5,178,218 A | 1/1993 | Dees | |
| 5,712,314 A | 1/1998 | Surles et al. | |
| 5,770,657 A | 6/1998 | Chou et al. | |
| 5,873,413 A | 2/1999 | Chatterji et al. | |
| 5,875,844 A | 3/1999 | Chatterji et al. | |
| 5,875,845 A | 3/1999 | Chatterji et al. | |
| 5,911,282 A | 6/1999 | Onan et al. | |
| 5,959,061 A | 9/1999 | Neumann et al. | |
| 6,016,870 A | 1/2000 | Dewprashad et al. | |
| 6,124,246 A | 9/2000 | Heathman et al. | |
| 6,196,316 B1 | 3/2001 | Bosma et al. | |
| 6,234,251 B1 | 5/2001 | Chatterji et al. | |
| 6,271,181 B1 | 8/2001 | Chatterji et al. | |
| 6,316,529 B1 | 11/2001 | Temme et al. | |
| 6,321,841 B1 | 11/2001 | Eoff et al. | |
| 6,328,106 B1 * | 12/2001 | Griffith ................. | C09K 8/508 166/295 |
| 6,448,206 B1 | 9/2002 | Griffith et al. | |
| 6,450,260 B1 | 9/2002 | James et al. | |
| 6,478,088 B1 | 11/2002 | Hansen et al. | |
| 6,802,375 B2 | 10/2004 | Bosma et al. | |
| 6,837,316 B2 | 1/2005 | Reddy et al. | |

(Continued)

FOREIGN PATENT DOCUMENTS

| CA | 2709646 A1 | 7/2009 |
|---|---|---|
| CN | 101451061 A | 6/2009 |

(Continued)

OTHER PUBLICATIONS

Silica, Crystalline; Occupational Safety and Health Administration; https://www.osha.gov/dsg/topics/silicacrystalline/; pp. 1 & 2 (Year: 2019).*

Bhaisora et al., "Innovative Application of Ultra-Lightweight Epoxy Resin-Cement Slurry Mixture Achieved Zonal Isolation Objectives and Secured Well Integrity: Case History From Offshore Gulf of Suez", IPTC-18504-MS, 2015.

Foianini et al., "Successful Identification and Bond Assessment of Epoxy-Based Resin Cement Behind Production Casing: Integrating Cementing Technology with New Log Interpretation Methodology To Provide an Innovative Well Integrity Solution", SPWLA 55th Annual Logging Symposium, May 18-22, 2014.

(Continued)

*Primary Examiner* — Anuradha Ahuja
(74) *Attorney, Agent, or Firm* — Dinsmore & Shohl LLP

(57) ABSTRACT

A cement composition is disclosed that includes a cement slurry and an epoxy resin system that includes at least one epoxy resin and a curing agent. The cement slurry has a density in a range of from 65 pcf to 180 pcf and includes a cement precursor material, silica sand, silica flour, a weighting agent, and manganese tetraoxide. The epoxy resin system includes at least one of 2,3-epoxypropyl o-tolyl ether, alkyl glycidyl ethers having from 12 to 14 carbon atoms, bisphenol-A-epichlorohydrin epoxy resin, or a compound having formula (I): $(OC_2H_3)$—$CH_2$—$O$—$R^1$—$O$—$CH_2$—$(C_2H_3O)$ where $R^1$ is a linear or branched hydrocarbyl having from 4 to 24 carbon atoms; and a curing agent.

18 Claims, No Drawings

(56) References Cited

U.S. PATENT DOCUMENTS

| | | |
|---|---|---|
| 6,880,642 B1 | 4/2005 | Garrett et al. |
| 7,673,686 B2 | 3/2010 | Nguyen et al. |
| 7,762,329 B1 | 7/2010 | Morgan et al. |
| 7,926,591 B2 | 4/2011 | Nguyen et al. |
| 7,956,017 B2 | 6/2011 | Gatlin et al. |
| 7,975,764 B2 | 7/2011 | Sullivan et al. |
| 8,157,009 B2 | 4/2012 | Patil et al. |
| 8,235,116 B1 | 8/2012 | Burts, Jr. et al. |
| 8,273,426 B1 | 9/2012 | Laramay et al. |
| 8,307,899 B2 | 11/2012 | Brenneis et al. |
| 8,664,285 B2 | 3/2014 | Birnbrich et al. |
| 8,789,595 B2 | 7/2014 | Guerrero et al. |
| 8,857,515 B2 | 10/2014 | Weaver |
| 8,864,285 B2 | 10/2014 | De Roeck |
| 8,936,087 B2 | 1/2015 | Nguyen et al. |
| 8,944,164 B2 | 2/2015 | Veldman et al. |
| 8,946,130 B2 | 2/2015 | Zamora et al. |
| 9,150,775 B2 | 10/2015 | Ostvold |
| 9,321,953 B1 | 4/2016 | Ferrell, Jr. et al. |
| 9,410,066 B2 | 8/2016 | Ghassemzadeh |
| 9,701,885 B2 | 7/2017 | Husein et al. |
| 9,828,293 B2 | 11/2017 | Yadav et al. |
| 9,902,891 B2 | 2/2018 | Hundt et al. |
| 9,932,510 B2 | 4/2018 | Walker et al. |
| 10,005,930 B2 | 6/2018 | Reddy |
| 10,081,755 B2 | 9/2018 | Ballard |
| 10,138,405 B2 | 11/2018 | Kulkarni et al. |
| 10,144,858 B2 | 12/2018 | Kennedy et al. |
| 2001/0035111 A1* | 11/2001 | Gienau .................. C08L 63/00 106/696 |
| 2002/0020530 A1 | 2/2002 | Griffith et al. |
| 2006/0219405 A1 | 10/2006 | Nguyen et al. |
| 2007/0093393 A1 | 4/2007 | Navarrete et al. |
| 2007/0102156 A1 | 5/2007 | Nguyen et al. |
| 2008/0110624 A1 | 5/2008 | Nguyen et al. |
| 2008/0277117 A1 | 11/2008 | Burts, Jr. et al. |
| 2010/0326660 A1 | 12/2010 | Ballard et al. |
| 2011/0088916 A1* | 4/2011 | Heijnen .................. C09K 8/50 166/387 |
| 2011/0203795 A1 | 8/2011 | Murphy et al. |
| 2011/0284247 A1* | 11/2011 | Zamora .................. C04B 26/14 166/387 |
| 2011/0308799 A1 | 12/2011 | Tarafdar et al. |
| 2012/0328377 A1 | 12/2012 | Brenneis et al. |
| 2013/0008654 A1 | 1/2013 | Deville et al. |
| 2013/0105162 A1 | 5/2013 | Abad et al. |
| 2013/0178590 A1 | 7/2013 | Jin et al. |
| 2013/0292116 A1 | 11/2013 | Nguyen et al. |
| 2014/0027116 A1 | 1/2014 | Suresh et al. |
| 2014/0076563 A1 | 3/2014 | Lin et al. |
| 2014/0083702 A1* | 3/2014 | Godfrey .............. G06F 12/0888 166/295 |
| 2014/0367105 A1 | 12/2014 | Karcher et al. |
| 2015/0152708 A1 | 6/2015 | Smith |
| 2015/0167424 A1* | 6/2015 | Richards .............. E21B 33/134 166/386 |
| 2016/0046853 A1* | 2/2016 | Chatterji .................. C09K 8/44 166/292 |
| 2016/0194544 A1 | 7/2016 | Jones et al. |
| 2016/0194548 A1 | 7/2016 | Xie et al. |
| 2016/0208157 A1 | 7/2016 | Vo et al. |
| 2016/0272875 A1 | 9/2016 | Ghumare et al. |
| 2016/0362599 A1 | 12/2016 | Wadekar et al. |
| 2017/0009122 A1 | 1/2017 | Funkhouser et al. |
| 2017/0130554 A1 | 5/2017 | Jones et al. |
| 2017/0137562 A1 | 5/2017 | Zheng et al. |
| 2017/0247607 A1 | 8/2017 | Hundt |
| 2017/0349804 A1 | 12/2017 | Kellum et al. |
| 2017/0350212 A1* | 12/2017 | Sabins .................. C04B 26/02 |
| 2018/0066489 A1 | 3/2018 | Pipchuk et al. |
| 2018/0216437 A1 | 8/2018 | Shafer |
| 2018/0346801 A1 | 12/2018 | Dandawate et al. |
| 2019/0249067 A1* | 8/2019 | Wagle .................. C09K 8/04 |
| 2020/0024503 A1 | 1/2020 | Watters et al. |
| 2021/0040376 A1 | 2/2021 | Devarapalli et al. |

FOREIGN PATENT DOCUMENTS

| | | |
|---|---|---|
| EP | 898049 A1 | 2/1999 |
| EP | 898050 A1 | 2/1999 |
| EP | 899415 A1 | 3/1999 |
| EP | 899416 A1 | 3/1999 |
| EP | 903461 A1 | 3/1999 |
| EP | 1031544 A2 | 8/2000 |
| EP | 2166028 A1 | 3/2010 |
| WO | 2014036218 A1 | 3/2014 |
| WO | 2014074112 A1 | 5/2014 |
| WO | 2014197827 A1 | 12/2014 |
| WO | 2014200889 A1 | 12/2014 |
| WO | 2015023186 A1 | 2/2015 |
| WO | 2015040241 A1 | 3/2015 |
| WO | 2016043979 A1 | 3/2016 |
| WO | 2016048303 A1 | 3/2016 |
| WO | 2016048332 A1 | 3/2016 |
| WO | 2016080974 A1 | 5/2016 |
| WO | 2016093827 A1 | 6/2016 |
| WO | 2016111674 A1 | 7/2016 |
| WO | 2017204812 A1 | 11/2017 |
| WO | 2019091900 A1 | 5/2019 |

OTHER PUBLICATIONS

Moe et al., "Anular pressure buildup: What it is and what to do about it", World Oil Deepwater Technology Supplement, Issue, p. 21-23, Aug. 2000.

Morris et al., "Resin-Based Cement Alternatives for Deepwater Well Construction", Society of Petroleum Engineers, SPE-155613-MS, 2012.

Nelson et al., "Well Cementing Fundamentals", Oilfield Review Summer, vol. 24, No. 2, pp. 59-60, 2012.

International Search Report and Written Opinion dated Mar. 15, 2019 pertaining to International application No. PCT/US2018/060282 filed Nov. 12, 2018, 13 pgs.

International Search Report and Written Opinion dated Jun. 21, 2019 pertaining to International application No. PCT/US2019/026882 filed Apr. 11, 2019, 14 pgs.

Office Action dated Mar. 10, 2020 pertaining to U.S. Appl. No. 16/117,974, filed Aug. 30, 2018, 39 pgs.

Notice of Allowance and Fee(s) Due dated Mar. 12, 2020 pertaining to U.S. Appl. No. 16/117,950, filed Aug. 30, 2018, 16 pgs.

Final Rejection pertaining to U.S. Appl. No. 16/117,902 dated Jan. 17, 2020.

Cestari, A. R. et al., "Synthesis, characterization and hydration analysis of a novel epoxy/superplasticizer oilwell cement slurry Some mechanistic features by solution microcalorimetry" Journal of Colloid and Interface Science, Apr. 27, 2012, pp. 359-368, vol. 392.

Elyas, O. et al. "Use of Polymer Resins for Surface Annulus Isolation Enhancement" SPE-192266-MS, Society of Petroleum Engineers, Apr. 26, 2018, pp. 1-8.

Al-Yami, A. et al. "Optimum Practices to Mitigate Gas Migration Problems in Deep Gas Wells" SPE-187700-MS, Society of Petroleum Engineers, Oct. 18, 2017, pp. 1-21.

Alsaihati, Z. A. et al. "An Overview of Polymer Resin Systems Deployed for Remedial Operations in Saudi Arabia" SPE-188122-MS, Society of Petroleum Engineers, Apr. 27, 2017, pp. 1-15.

International Search Report and Written Opinion dated Nov. 7, 2019 pertaining to International application No. PCT/US2019/047846 filed Aug. 23, 2019.

International Search Report and Written Opinion dated Nov. 7, 2019 pertaining to International application No. PCT/US2019/047842 filed Aug. 23, 2019.

Office Action dated Sep. 17, 2019 pertaining to U.S. Appl. No. 16/117,902, filed Aug. 30, 2018, 26 pgs.

Office Action dated Sep. 30, 2019 pertaining to U.S. Appl. No. 16/117,974, filed Aug. 30, 2018, 35 pgs.

(56) References Cited

OTHER PUBLICATIONS

Office Action dated Nov. 18, 2019 pertaining to U.S. Appl. No. 16/117,950, filed Aug. 30, 2018, 22 pgs.
International Search Report and Written Opinion dated Jul. 23, 2020 pertaining to International application No. PCT/US2020/028050 filed Apr. 14, 2020, 15 pgs.
International Search Report and Written Opinion dated Jul. 23, 2020 pertaining to International application No. PCT/US2020/028082 filed Apr. 14, 2020, 15 pgs.
U.S. Office Action dated Sep. 7, 2021 pertaining to U.S. Appl. No. 16/117,902, filed Aug. 30, 2018, 29 pages.
U.S. Office Action dated Sep. 10, 2021 pertaining to U.S. Appl. No. 16/718,784, filed Dec. 18, 2019, 81 pages.
Notice of Allowance and Fee(s) Due dated Dec. 10, 2020 pertaining to U.S. Appl. No. 16/809,892, filed Mar. 5, 2020, 14 pgs.
International Search Report and Written Opinion dated Dec. 11, 2020 pertaining to International application No. PCT/US2020/050616 filed Sep. 14, 2020, 13 pgs.
Notice of Allowance and Fee(s) Due dated Dec. 30, 2020 pertaining to U.S. Appl. No. 16/809,822, filed Mar. 5, 2020, 13 pgs.
U.S. Office Action dated Jul. 23, 2021 pertaining to U.S. Appl. No. 16/718,716, filed Dec. 18, 2019, 28 pages.
Notice of Allowance and Fee(s) Due dated Aug. 12, 2021 pertaining to U.S. Appl. No. 16/117,974, filed Aug. 30, 2018, 14 pages.
Notice of Allowance and Fee(s) Due dated Aug. 3, 2021 pertaining to U.S. Appl. No. 16/826,989, filed Mar. 23, 2020, 14 pages.
Notice of Allowance and Fee(s) Due dated Aug. 5, 2021 pertaining to U.S. Appl. No. 16/829,470, filed Mar. 25, 2020, 12 pages.
Office Action dated Jun. 24, 2020 pertaining to U.S. Appl. No. 16/117,974, filed Aug. 30, 2018, 41 pgs.
Office Action dated Oct. 6, 2020 pertaining to U.S. Appl. No. 16/809,892, filed Mar. 5, 2020, 44 pgs.
Office Action dated Oct. 6, 2020 pertaining to U.S. Appl. No. 16/809,822, filed Mar. 5, 2020, 44 pgs.
Office Action dated Jan. 27, 2021 pertaining to U.S. Appl. No. 16/826,989, filed Mar. 23, 2020, 58 pgs.
Office Action dated Jan. 28, 2021 pertaining to U.S. Appl. No. 16/829,470, filed Mar. 25, 2020, 51 pgs.
Office Action dated Mar. 11, 2021 pertaining to U.S. Appl. No. 16/117,974, filed Aug. 30, 2018, 43 pgs.
Office Action dated Feb. 18, 2021 pertaining to U.S. Appl. No. 16/718,716, filed Dec. 18, 2019, 66 pgs.
Office Action dated May 7, 2021 pertaining to U.S. Appl. No. 16/117,902, filed Aug. 30, 2018, 76 pages.
Office Action dated May 25, 2021 pertaining to U.S. Appl. No. 16/829,470, filed Mar. 25, 2020, 25 pages.
Office Action dated May 21, 2021 pertaining to U.S. Appl. No. 16/826,989, filed Mar. 23, 2020, 25 pages.
Office Action dated Nov. 17, 2020 pertaining to U.S. Appl. No. 16/117,974, filed Aug. 30, 2018, 46 pgs.
International Search Report and Written Opinion dated Jun. 1, 2021 pertaining to International application No. PCT/US2021/018660 filed Feb. 19, 2021, 14 pages.
U.S. Office Action dated Oct. 12, 2021 pertaining to U.S. Appl. No. 16/718,716, filed Dec. 18, 2019, 21 pages.
U.S. Office Action dated Feb. 3, 2022 pertaining to U.S. Appl. No. 16/718,784, filed Dec. 18, 2019, 21 pages.
U.S. Notice of Allowance and Fee(s) Due dated Feb. 9, 2022 pertaining to U.S. Appl. No. 16/117,902, filed Aug. 30, 2018, 15 pages.
U.S. Notice of Allowance and Fee(s) Due dated Feb. 7, 2022 pertaining to U.S. Appl. No. 16/718,716, filed Dec. 18, 2019, 13 pages.
U.S. Notice of Allowance and Fee(s) Due dated Mar. 4, 2022 pertaining to U.S. Appl. No. 16/906,607, filed Jun. 19, 2020, 9 pages.

* cited by examiner

CEMENT COMPOSITIONS INCLUDING EPOXY RESIN SYSTEMS FOR PREVENTING FLUID MIGRATION

CROSS-REFERENCE TO RELATED APPLICATION

This application is a divisional application of U.S. patent application Ser. No. 16/117,974 filed Aug. 30, 2018, the entire disclosure of which is hereby incorporated herein by reference.

TECHNICAL FIELD

Embodiments of the present disclosure generally relate to natural resource well drilling and, more specifically, to cement compositions for zonal isolation and mitigation of fluid migration.

BACKGROUND

Extracting subterranean hydrocarbon sources may require drilling a hole from the surface to the subterranean geological formation housing the hydrocarbons. Specialized drilling techniques and materials are utilized to form the bore hole and extract the hydrocarbons. Specialized materials utilized in drilling operations include materials for sealing the casing-casing annulus between two tubular strings installed in the wellbore. Such specialized materials may also be formulated for specific downhole conditions.

A wellbore is a hole that extends from the surface to a location beneath the surface to permit access to hydrocarbon-bearing subterranean formations. The wellbore contains at least a portion of a fluid conduit that links the interior of the wellbore to the surface. The fluid conduit coupling the interior of the wellbore to the surface may be capable of permitting regulated fluid flow from the interior of the wellbore to the surface. The fluid conduit may also permit access between equipment on the surface and the interior of the wellbore. The fluid conduit may be defined by one or more tubular strings, such as casings for example, inserted into the wellbore and secured in the wellbore.

The fluid conduit may be defined by one or more tubular strings having at least two openings (typically on opposing ends) with an enclosing surface having an interior and exterior surface. The interior surface acts to define the bounds of the fluid conduit. Examples of tubular strings and portions of tubular strings used in the wellbore as fluid conduits or for making or extending fluid conduits include casing, production liners, coiled tubing, pipe segments, tubes, pipe strings, mechanical structures with interior voids, or combinations of these. A tubular string may include an assembly of several shorter tubular strings connected to one another, such as joined pipe segments or casing.

When positioning a tubular string or a portion of a tubular string in the wellbore, the exterior surfaces of the tubular string and the wellbore wall form and define a wellbore annulus. The wellbore annulus has a volume in between the external surface of the tubular string and the wellbore wall. Additional casing-casing annuli may be formed by installing progressively smaller tubular strings within the larger tubular string initially secured in the wellbore. Installing each tubular string includes positioning the tubular string in the wellbore and placing a sealing material in the wellbore annulus or the casing-casing annulus to seal the annulus.

Primary sealing refers to the process of initially sealing the annulus upon installation of the casing or other tubular string. Primary sealing may refer to initial sealing of the annulus between the exterior surface of the tubular string and the wellbore wall of the wellbore or initial sealing of a casing-casing annulus. Primary sealing forms a protective solid sheath around the exterior surface of the tubular string.

Primary sealing in conventional wellbore installations may be performed with wellbore cement and, thus, may be commonly referred to as "primary cementing." During hydrocarbon production, the cement sheath may be subjected to temperature and pressure cycling. This temperature and pressure cycling may cause micro-cracks to form in the cement sheath. Fluids, such as gas or liquids, may then migrate through the micro-cracks, which may cause pressure buildup in the annuli, referred to as casing-casing annulus pressure. Increasing casing-casing annulus pressure caused by micro-cracks in the cement sheath may cause damage to interior structures of the well, such as interior casings and production liners. Greater casing-casing annulus pressure may also cause fluids to migrate through the cement sheath to the surface, where the fluids may be released to the environment. These effects of fluid migration are even more pronounced in wells for hydrocarbon gases.

Additionally, during drilling of a wellbore, cementing the wellbore, or both, lost circulation zones may be encountered that result in loss of drilling fluid, cement, or other fluids. In a lost circulation zone, the drilling fluid, cement, or other fluid flows out of the wellbore and into the surrounding formation. Lost circulation zones may result in increased cost of the overall well through increased material costs to replace lost fluids and downtime to remediate the lost circulation zone. Lost circulation zones may be remediated by introducing a lost circulation material into the lost circulation zone to seal the lost circulation zone and prevent further fluid loss. Lost circulation materials (LCM) can include cement or other materials having different particle sizes. However, wellbore cements used as lost circulation materials may have viscosities that limit the depth to which the wellbore cements can be injected into a lost circulation zone. Wellbore cements used as lost circulation materials may also preclude the wellbore cements from use in formations with narrow fracture pressure gradient zones.

Additionally, cements used to isolate lost circulation zones may also be subjected to temperature and pressure cycling, which may cause micro-cracks to form in the cement. As previously described, these micro-cracks may enable fluid migration through the cement.

SUMMARY

Accordingly, there is a need for cement compositions that are more resistant to formation of micro-cracks caused by thermal and pressure cycling of the wellbore. There is also a need for cement compositions that can be used to remediate existing wellbore installations that have developed micro-cracks and casing-casing annulus pressure increases. Moreover, there is a need for cement compositions that can more deeply penetrate into lost circulation zones and provide improved wellbore isolation.

This need is met by the embodiments of the cement compositions described in this disclosure. In these embodiments, the cement compositions include a cement slurry and an epoxy resin system. The cement slurry may include a cement precursor, silica sand, silica flour, weighting agent, and manganese tetraoxide, and the epoxy resin system may include at least one epoxy resin and at least one curing agent. Once cured, the cement compositions may form a barrier to prevent drilling fluids at a pressure greater than the formation pressure from flowing out of the wellbore and into the formation. The cement compositions may exhibit greater compressive strength, reduced density, and greater elasticity compared to wellbore cements that do not include an epoxy resin system. These properties may enable the cement compositions of the present disclosure to resist degradation, such as formation of micro-cracks, caused by temperature and pressure cycling during production. The cement compositions may, therefore, prevent penetration of drilling fluids into the formation. The cement compositions may be more resistive to corrosive fluids than conventional drilling cements and other materials used for lost circulation zone remediation. The cement compositions can withstand greater pressures than conventional drilling cements, which may improve the zonal isolation and mitigate fluid migration through the cement composition.

For example, in some embodiments, the cement compositions may withstand pressures in a range of from 7,000 pounds per square inch ("psi," which equals 6894.76 Pascal) to 15,000 psi that are greater than conventional drilling cements. Conventional drilling cements can only withstand pressures in a range of from 500 psi to 5,000 psi. This ability of the cement compositions to withstand greater pressures may enable the cement compositions to be injected deeper into high pressure formations compared to wellbore cements that do not include an epoxy resin system. A high pressure formation is a formation that has a pressure in a range of from about 2,000 psi to about 20,000 psi. Also, the epoxy resin system, when added to the cement slurry, may reduce the viscosity of the cement composition compared to the viscosities of wellbore cements that do not include an epoxy resin system. The reduced viscosity of the cement compositions of the present disclosure may allow the cement compositions to be suitable for injection into low-injectivity zones, such as narrow fracture pressure gradient zones, where wellbore cements that do not include an epoxy resin system cannot be used. Additionally, the cement compositions may be injected into the formation through the drill string, including through the drill bit, due to the reduced viscosity resulting from addition of the epoxy resin system. In some embodiments, the plastic viscosity may be from about 10 to about 500. Additionally, in some embodiments, the yield point may be from about 3 to about 100.

According to some embodiments, a cement composition is disclosed that includes a cement slurry and an epoxy resin system that includes at least one epoxy resin and a curing agent. The cement slurry has a density in a range of from 65 pounds per cubic foot ("pcf") to 180 pcf and includes a cement precursor material, silica sand, silica flour, a weighting agent, and manganese tetraoxide. The epoxy resin system includes at least one of 2,3-epoxypropyl o-tolyl ether, alkyl glycidyl ethers having from 12 to 14 carbon atoms, bisphenol-A-epichlorohydrin epoxy resin, or a compound having formula (I): $(OC_2H_3)$—$CH_2$—O—$R^1$—O—$CH_2$—$(C_2H_3O)$ where $R^1$ is a linear or branched hydrocarbyl having from 4 to 24 carbon atoms; and a curing agent.

According to some embodiments, a method is disclosed that includes introducing a cement composition into a lost circulation zone or an annulus and curing the cement composition to form a cured cement composition, where the cured cement composition seals the lost circulation zone or the annulus. The cement composition includes a cement slurry and an epoxy resin system. The cement slurry has a density in a range of from 65 pcf to 180 pcf and includes silica sand, silica flour, a weighting agent, and manganese tetraoxide. The epoxy resin system includes at least one of 2,3-epoxypropyl o-tolyl ether, alkyl glycidyl ethers having from 12 to 14 carbon atoms, bisphenol-A-epichlorohydrin epoxy resin, or a compound having the formula $(OC_2H_3)$—$CH_2$—O—$R^1$—O—$CH_2$—$(C_2H_3O)$ where $R^1$ is a linear or branched hydrocarbyl having from 4 to 24 carbon atoms; and a curing agent.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

As used throughout this disclosure, the term "hydrocarbon-bearing formation" or "formation" refers to a subterranean geologic region containing hydrocarbons, such as crude oil, hydrocarbon gases, or both, which may be extracted from the subterranean geologic region.

As used throughout this disclosure, the term "fluid" may include liquids, gases, or both. As used throughout the disclosure, "spacer fluid" refers to a fluid utilized to maintain separation between any two other materials utilized in well production, such as fluids that may be incompatible with each other, for example.

As used in this disclosure, the term "narrow fracture gradient zone" refers to a zone in a formation in which the difference between the pore pressure gradient and the fracture pressure gradient is less than or equal to 100 pounds per square inch (psi) (690 kilopascals (kPa), where 1 psi=6.9 kPa). The "pore pressure gradient" refers to the pressure within the pores of the subterranean formation as a function of depth. The "fracture gradient" refers to the pressure required to fracture the formation as a function of depth.

The wellbore forms a pathway capable of permitting both fluid and apparatus to traverse between the surface and the hydrocarbon-bearing formation. Besides defining the void volume of the wellbore, the wellbore wall may also act as the interface through which fluid can transition between the formations through which the wellbore traverses and the interior of the well bore. The wellbore wall can be unlined (that is, bare rock or formation) to permit such interaction with the formation or lined (that is, with a tubular string as previously described in this disclosure) so as to not permit such interactions.

The wellbore may contain at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As previously described, the fluid conduit may be defined by a tubular string installed in the wellbore. The wellbore annulus has a volume defined between the external surface of the tubular string and the wellbore wall. As wellbore drilling continues and the wellbore extends deeper into the subterranean formation, one or more additional tubular strings may be installed within the fluid conduit defined by the initial tubular string. Additional tubular strings may have outer cross-sectional dimensions that are less than the inner cross-sectional dimensions of the tubular strings within which the additional tubular strings are disposed. The additional tubular string, when installed in the wellbore, may form a casing-casing annulus defined between the exterior surface of the additional tubular string and the interior surface of the tubular string surrounding the additional tubular string. After drilling is complete and the wellbore is fitted with production tubing for production, the wellbore may comprise a plurality of tubular strings of progressively smaller cross-sectional dimensions that define a wellbore annulus and a plurality of casing-casing annuli.

As previously described in this disclosure, installing each tubular string may include positioning the tubular string in the wellbore and primary sealing the tubular string in the wellbore. The primary sealing process may include placing the cement composition in the annulus and curing the cement composition to seal the annulus. Primary sealing may anchor and support the tubular string in the wellbore and may protect the tubular string from corrosion caused by fluids from the hydrocarbon-containing formation. Primary sealing may also provide a hydraulic seal in the annulus that may prevent migration of gases and liquids from one side of the hydraulic seal to the other. This hydraulic seal may prevent fluid communication between production zones in the wellbore, referred to as zonal isolation, or may prevent migration of fluids to the surface. Before primary sealing can be performed, the wellbore may be drilled using a drill string in the presence of a drilling fluid. At the conclusion of drilling, the wellbore may contain the drilling fluid. With the drilling fluid left in the wellbore, the tubular string may be positioned in the wellbore. When the tubular string is positioned in the wellbore, the drilling fluid may occupy the interior volume of the tubular string as well as the annulus between the exterior surface of the tubular string and the wellbore wall. For interior tubular strings, the tubular string may form a wellbore annulus between the exterior surface and the wellbore wall along part of the length of the tubular string and a casing-casing annulus between the exterior surface and an interior surface of the previously installed casing along an uphole part of the length of the tubular string.

Embodiments of the present disclosure are directed to cement compositions and methods of using the cement compositions. The cement compositions of the present disclosure may include a cement slurry and an epoxy resin system. The cement compositions may be introduced to a lost circulation zone or an annulus, such as one or more of a wellbore annulus, a casing-casing annulus, or combinations of these.

According to some embodiments, the cement slurry may have a density in a range of from 65 pounds per cubic foot (pcf) to 180 pcf and may include a cement precursor, silica sand, silica flour, a weighting agent, and manganese tetraoxide. The epoxy resin system may include at least one epoxy resin and at least one curing agent. In some embodiments, the epoxy resin may include at least one of 2,3-epoxypropyl o-tolyl ether, alkyl glycidyl ethers having from 12 to 14 carbon atoms, bisphenol-A-epichlorohydrin epoxy resin, or a compound having formula (I):

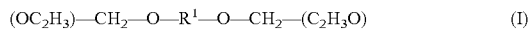

$$(OC_2H_3)\text{---}CH_2\text{---}O\text{---}R^1\text{---}O\text{---}CH_2\text{---}(C_2H_3O) \quad (I)$$

where $R^1$ is a linear or branched hydrocarbyl having from 4 to 24 carbon atoms.

As discussed subsequently in this disclosure, the cement compositions can be prepared with different density, viscosity, and mechanical properties by changing the concentrations of the epoxy resin or curing agent in the cement composition. For example, the cement compositions can be formulated to produce a final cured epoxy that is solid or viscous, as needed. Thus, the epoxy resin system may be adapted for use in different downhole conditions of the wellbore. In some embodiments, the cement compositions with the epoxy resin system may have reduced viscosity compared to wellbore cements that do not include the epoxy resin system, which makes the cement compositions of the present disclosure more suitable for injection into formations with narrow fracture gradient zones compared to wellbore cements that do not include an epoxy resin system. In some embodiments, the yield point of the cement compositions with the epoxy resin system is from about 10 pounds per square foot ($lb/ft^2$) to about 40 $lb/ft^2$ measured according to methods provided subsequently in the present disclosure. In formations with narrow fracture gradient zones, wellbore cements that do not include an epoxy resin system and have greater viscosities may increase the pressure greater than the fracture pressure of the formation, which may result in fracturing the formation or other damage to the formation that can result in increasing lost circulation. The cement compositions of the present application may be adjusted to modify the rheology, density, and compressive strength of the cement composition, which may reduce or prevent the well integrity from being compromised during the well's lifetime.

The Cement Slurry

The cement slurry may include a cement precursor material, water, silica sand, silica flour, a weighting agent, and manganese tetraoxide. In some embodiments, the cement slurry may additionally include one or more of an expansion additive, a retarder, a friction reducer, a gas block stabilizer, a dispersant, a surfactant, or combinations of these.

The cement precursor material may be any suitable material which, when mixed with water, can be cured into a cement. The cement precursor material may be hydraulic or non-hydraulic cement precursors. A hydraulic cement precursor material may include a mixture of limestone, clay and gypsum burned together that may harden instantly or within a few minutes while in contact with water. A non-hydraulic cement precursor material may include mixtures of lime, gypsum, plasters and oxychloride. A non-hydraulic cement precursor may take longer to harden or may require drying conditions for proper strengthening. While hydraulic cement precursors may be more commonly utilized in drilling applications, it should be understood that other cement precursors are contemplated. In some embodiments, the cement precursor material may be Portland cement. Portland cement is a hydraulic cement precursor (cement precursor material that not only hardens by reacting with water but also forms a water-resistant product) produced by pulverizing clinkers, which contain hydraulic calcium silicates and one or more of the forms of calcium sulphate as an interground addition.

In some embodiments, the cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3\text{---}Fe_2O_3$), gypsum ($CaSO_4.2H_2O$), sodium oxide, potassium oxide, limestone, lime (calcium oxide), hexavalent chromium, calcium aluminate, or combinations of these. The cement precursor material may include Portland cement, siliceous fly ash, calcareous fly ash, slag cement, silica fume, other cement precursor material, or any combination of these. In some embodiments, the cement slurry may contain from 10 weight percent (wt. %) to 90 wt. % of the cement precursor material based on the total weight of the cement slurry. The cement slurry may contain from 10 wt. % to 80 wt. %, from 10 wt. % to 70 wt. %, from 10 wt. % to 60 wt. %, or from 10 wt. % to 50 wt. % of the cement precursor material based on the total weight of the cement slurry.

The water in the cement slurry may be distilled water, deionized water, or tap water. In some embodiments, the water may contain additives or contaminants. The water may include freshwater or seawater, natural or synthetic brine, salt water, formation water, brackish water, or combinations of these. In some embodiments, salt or other organic compounds may be incorporated into the water to control certain properties of the water, and thus control properties of the cement slurry, such as density. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these. In some embodiments, the cement slurry may contain from 5 wt. % to 70 wt. % water based on the total weight of the cement slurry.

As previously described in this disclosure, the cement slurry may include silica sand, silica flour, a weighting agent, and manganese tetraoxide. The addition of one or more of these components to the cement slurry may reduce settling in the cement slurry. In some embodiments, the inclusion of one or more of the silica sand, silica flour, weighting agent, and manganese tetraoxide may reduce the porosity of the cement composition by including different particles size distributions of particles and components.

The silica sand may include any naturally-occurring or man-made silica sand. Silica sand may be used to stabilize the strength and permeability of the cement composition at downhole temperatures between 230° F. and 700° F. (110° C. and 371° C.), prevent strength retrogression, and decrease permeability. In some embodiments, the silica sand may have an average particle size of from 100 to 200 micrometers ($\mu m$) (microns). For example, in some embodiments, the silica sand may have an average particle size of from 100 $\mu m$ to 180 $\mu m$, from 100 $\mu m$ to 175 $\mu m$, from 150 $\mu m$ to 200 $\mu m$, from 150 $\mu m$ to 180 $\mu m$, from 150 $\mu m$ to 175 $\mu m$, from 175 $\mu m$ to 200 $\mu m$, or from 180 $\mu m$ to 200 $\mu m$. In some embodiments, the cement slurry may comprise about 1 percent to 50 percent by weight of cement (% BWOC) silica sand. As used in this disclosure, the term "by weight of cement (BWOC)" refers to the weight of the constituent as a percentage of the weight of the cement precursor material. In some embodiments, the cement slurry may include from about 1% to 20% BWOC, from about 1% to 30% BWOC, from about 1% to 40% BWOC, from 10% to 30% BWOC, from about 10% to 40% BWOC, from about 10% to 50% BWOC, from about 20% to 40% BWOC, from about 20% to 50% BWOC, or from about 30% to 50% BWOC silica sand.

The silica flour may be any naturally-occurring or man-made silica flour. The silica flour may have an average particle size less than the silica sand. In some embodiments, the silica flour may have an average particle size of less than or equal to 15 $\mu m$, less than or equal to 12 $\mu m$, or even less than or equal to 10 $\mu m$. In some embodiments, the silica flour may have an average particle size of from 1 $\mu m$ to 15 $\mu m$, from 1 $\mu m$ to 12 $\mu m$, from 1 $\mu m$ to 10 $\mu m$, from 5 $\mu m$ to 15 $\mu m$, from 5 $\mu m$ to 12 $\mu m$, or from 5 $\mu m$ to 10 $\mu m$. In some embodiments, the cement slurry may include from 5% to 50% BWOC silica flour. In other embodiments, the cement slurry may include from 5% to 40% BWOC, 5% to 30% BWOC, 5% to 20% BWOC, 5% to 10% BWOC, 10% to 50% BWOC, 10% to 40% BWOC, 10% to 30% BWOC, 10% to 20% BWOC, 20% to 50% BWOC, 20% to 40% BWOC, 20% to 30% BWOC, 30% to 50% BWOC, 30% to 40% BWOC, or from 40% to 50% BWOC silica flour.

The silica flour may be used in combination with the silica sand to formulate cement with a density of from 130 pcf to 165 pcf, which allows for resistance of gas migration problems. The combination of the silica sand and silica flour may increase the solids packing density of the cement composition and thus reduce the permeability of cured cement to gas flow.

In some embodiments of the cement composition, the cement slurry may include a weighting agent, which may also be referred to as a "weighting material" or "weight material." The weighting agent may include particulate solids having a specific gravity (SG) that may operate to increase the density of the cement slurry. Examples of weighting agents may include, but are not limited to, sand, barite (barium sulfate), hematite, calcium carbonate, siderite, ilmenite, silica sand, manganese oxide (MnO), hausmanite (manganese tetroxide ($Mn_3O_4$)), zinc oxide, zirconium oxide, iron oxide, fly ash, or any combination of these weighting agents. The weighting agent can be obtained from any readily available source. The weighting agent may have a specific gravity (SG) of from 2 to 6, from 2 to 5, from 3 to 6, or from 3 to 5. In some embodiments, the weighting agent may have a specific gravity of about 4.95. In some embodiments, the weighting agent may have a mean particle size distribution of from 0.1 $\mu m$ to 50 $\mu m$, or from about 0.1 $\mu m$ to 40 $\mu m$, from about 0.1 $\mu m$ to 30 $\mu m$, from about 0.1 $\mu m$ to 20 $\mu m$, from about 0.1 $\mu m$ to 10 $\mu m$, from about 10 $\mu m$ to to 50 $\mu m$, from about 10 $\mu m$ to 40 $\mu m$, from about 10 $\mu m$ to 30 $\mu m$, from about 10 $\mu m$ to 20 $\mu m$, from about 20 $\mu m$ to 50 $\mu m$, from about 20 $\mu m$ to 40 $\mu m$, from about 20 $\mu m$ to 30 $\mu m$, from about 30 $\mu m$ to 50 $\mu m$, from about 30 $\mu m$ to 40 $\mu m$, or from about 40 $\mu m$ to 50 $\mu m$. In some embodiments, the cement slurry may include from 10% BWOC to 70% BWOC weighting agent. In other embodiments, the cement slurry may include from 10% BWOC to 60% BWOC, 10% BWOC to 50%, 10% BWOC to 40% BWOC, 10% BWOC to 30% BWOC, 10% BWOC to 20% BWOC, 20% BWOC to 70% BWOC, 20% BWOC to 60% BWOC, 20% BWOC to 50%, 20% BWOC to 40% BWOC, 20% BWOC to 30% BWOC, 30% BWOC to 70% BWOC, 30% BWOC to 60% BWOC, 30% BWOC to 50% BWOC, 30% BWOC to 40% BWOC, 40% BWOC to 70% BWOC, 40% BWOC to 60% BWOC, 40% BWOC to 50% BWOC, 50% BWOC to 70% BWOC, 50% BWOC to 60% BWOC, or 60% BWOC to 70% BWOC weighting agent.

In some embodiments of the cement composition, the cement slurry may include manganese tetroxide. The manganese tetroxide can be from any readily available source. The manganese tetroxide can be in the form of a particulate solid. In some embodiments, the manganese tetroxide ($Mn_3O_4$) may have an average particle size of from 1 $\mu m$ to 10 $\mu m$, or about 5 $\mu m$. In some embodiments, the properties of the manganese tetroxide particles may be such that the small particle size, spherical shape, and specific gravity may allow for reduced solids loading and settling compared to other compounds, such as $CaCO_3$ and $BaSO_4$. In some embodiments the specific gravity of manganese tetroxide is from about 4.7 to about 5. The low plastic viscosity associated with manganese tetroxide may result in less friction in particle-to-particle interactions due to their spherical shape. In some embodiments, the cement slurry may include from 10% BWOC to 70% BWOC $Mn_3O_4$. In other embodiments, the cement slurry may include from 10% BWOC to 60% BWOC, 10% BWOC to 50%, 10% BWOC to 40% BWOC, 10% BWOC to 30% BWOC, 10% BWOC to 20%

BWOC, 20% BWOC to 70% BWOC, 20% BWOC to 60% BWOC, 20% BWOC to 50%, 20% BWOC to 40% BWOC, 20% BWOC to 30% BWOC, 30% BWOC to 70% BWOC, 30% BWOC to 60% BWOC, 30% BWOC to 50% BWOC, 30% BWOC to 40% BWOC, 40% BWOC to 70% BWOC, 40% BWOC to 60% BWOC, 40% BWOC to 50% BWOC, 50% BWOC to 70% BWOC, 50% BWOC to 60% BWOC, or 60% BWOC to 70% BWOC $Mn_3O_4$.

In some embodiments, the cement slurry may also include an expansion additive. The expansion additive can be selected from known expansion additive compounds. Examples of expansion additives may metal oxides. In further embodiments, the metal oxides may include calcium oxide (CaO) and magnesium oxide (MgO) or metal oxides of zinc, magnesium, iron, aluminum powders, and combinations thereof. In further embodiments, the expansion additive may be a calcined magnesium oxide. In some embodiments, the expansion additive may be a mixture of calcium oxide and magnesium oxide. In some embodiments, the cement slurry may include less than or equal to 10% BWOC expansion additive. In other embodiments, the cement slurry may comprise less than or equal to 5% BWOC expansion additive. In some embodiments, the cement slurry may include from 0% BWOC to 10% BWOC, from 0% BWOC to 5% BWOC, from 0.1% BWOC to 10% BWOC, from 0.1% BWOC to 5% BWOC, or from 1% BWOC to 10% BWOC expansion additive.

During curing, hydration of magnesium oxide to magnesium hydroxide may provide an expansive force within the cement matrix. Casing diameters may be affected by changes in temperature and pressure, and therefore, the diameters of such casings and liners may be reduced or expanded, which can lead to the formation of a microannulus. The expansion additive may be used in the cement composition to maintain a seal around the casing and against the formation to achieve superior bonding as measured by the shear bond test described subsequently in this disclosure. Conventional cements have shear bond strength of about 100 psi to about 300 psi. In some embodiments, the shear bond strength of the cement composition is greater than 250 psi. In further embodiments, the shear bond strength is from about 250 psi to about 800 psi or greater than about 300 psi. In some embodiments of the cement composition, the expansion additive may provide excellent expansion (measured at API Recommended Procedure 10B-5 (2005)). In some embodiments, the expansion is from about 0.001 mm to about 18 mm. In some embodiments, the expansion additives may be added when the downhole temperature is greater than about 140° F. (60° C.).

In some embodiments, the cement slurry may include from 0.001% BWOC to 70% BWOC of one or more additives based on the weight of the cement precursor. In some embodiments, the one or more additives may include a dispersant containing one or more anionic groups. The dispersant may include synthetic sulfonated polymers, lignosulfonates with carboxylate groups, hydroxylated sugars, other anionic groups, or combinations of any of these.

In some embodiments, the one or more additives may include a fluid loss additive. In some embodiments, the fluid loss additive may include non-ionic cellulose derivatives. In some embodiments, the fluid loss additive may be hydroxyethylcellulose (HEC). In other embodiments, the fluid loss additive may be a non-ionic synthetic polymer (for example, polyvinyl alcohol or polyethyleneimine). In some embodiments, the fluid loss additive may be an anionic synthetic polymer, such as 2-acrylamido-2-methylpropane sulfonic acid (AMPS) or AMPS-copolymers, including lattices of AMPS-copolymers. In some embodiments, the fluid loss additive may include bentonite. In some embodiments, the fluid loss additive may include an acrylamide copolymer, an aliphatic amide polymer, an acrylic polymer, bentonite, latex polymers, gilsonite, additives to latex (for example, styrene-butadiene latex in combination with nonionic and anionic surfactants), octylphenol ethoxylate, polyethylene oxide, copolymers of maleic anhydride, 2-hydroxypropyl acrylate, or combinations of these. In some embodiments, the cement slurry may include less than or equal to 5% BWOC fluid loss additive. In further embodiments, the cement slurry may include less than or equal to 1% BWOC fluid loss additive. In additional embodiments, the cement slurry may include less than or equal to 0.5% BWOC fluid loss additive. In some embodiments, the cement slurry may include from 0.001% BWOC to 5% BWOC fluid loss additive, from 0.001% BWOC to 1% BWOC fluid loss additive, from 0.001% BWOC to 0.5% BWOC fluid loss additive, or from 0.001% BWOC to 0.01% BWOC fluid loss additive.

In further embodiments of the cement composition, the cement slurry may further include a retarder. In some embodiments, the retarder may include both a high temperature retarder and a low temperature retarder. A high temperature retarder may operate at temperatures from about 180° F. to about 450° F. A low temperature retarder may operate at temperatures from about 120° F. to about 180° F. In some embodiments, the low temperature retarder may include calcium lignosulfonate. In some embodiments, the high temperature retarder may include ethylene glycol. In other embodiments, the high temperature retarder may include a mixture of a sodium salt of an organic acid and an inorganic salt. Other retarders that can be used may include, but are not limited to, modified lignosulfonates, sulfamethylated lignins, inorganic salts, acrylic polymers, sodium lignosulfonates, sodium tetraborate, aromatic polymer derivatives, a mixture of a sodium salt of alicyclic acid and an aminated aromatic polymer, an aliphatic amide polymer, scleroglucan, copolymers of isobutene and maleic anhydride, amino-N-([alkylidene]phosphonic acid) derivatives, alkanolamine-hydroxy carboxy acid salts (for example, tartaric acid and ethanolamine), phosphonocarboxylic acids, dicyclopentadiene bis(methylamine) methylenephosphonate, lignosulfonate derivatives, carbohydrates grafted with vinyl polymers, carboxymethyl hydroxyethylcellulose, wellan gum, Borax, carrageenan, polyethylene amine derivatives and amides, copolymers from maleic acid and 2-acrylamido-2 methylpropane sulfonic acid, ethylenediamine-tetramethylene phosphonic acid, polyoxyethylene phosphonic acid, citric acid, polyacrylic acid phosphinate, or combinations of these. In some embodiments, the cement slurry may include less than or equal to 10% BWOC retarder, such as less than or equal to 5% BWOC, or even less than or equal to 3% BWOC retarder. In some embodiments, the cement slurry may include from 0.0% BWOC to 10% BWOC retarder. In some embodiments, the cement slurry may include from 0.1% BWOC to 10% BWOC, from 1% BWOC to 10% BWOC, from 3% BWOC to 10% BWOC, or from 5% BWOC to 10% BWOC retarder.

In some embodiments, the cement slurry may include a friction reducer. In some embodiments, the friction reducer may be a sulfonic acid salt or an aromatic polymer derivative. Other cement friction reducers may include, but are not limited to, polyoxyethylene sulfonate, acetone formaldehyde cyanide resins, polyoxethylated octylphenol, copolymers of maleic anhydride and 2-hydroxypropyl acrylate, allyloxybenzene sulfonate, allyloxybenzene phosphonate, ferrous lignosulfonate, ferrous sulfate, tannic acid, alkali lignosulfonate, acetone polycondensate, formaldehyde polycondensate, sulfonated naphthalene formaldehyde condensate, sulfonated indene resins and sulfonated indene-cumarone resins, melamine sulfonate polymers, vinyl sulfonate polymers, styrene sulfonate polymers, polyethyleneimine phosphonate, casein polysaccharides, or combinations of these. In some embodiments, the cement slurry may include less than or equal to 10% BWOC friction reducer, such as less than or equal to 5% BWOC, or less than or equal to 1% BWOC, or even less than or equal to 0.5% BWOC friction reducer. In some embodiments, the cement slurry may include from 0.0% BWOC to 10% BWOC, from 0.0% BWOC to 5% BWOC, from 0.0% BWOC to 1% BWOC, from 0.0% BWOC to 0.5% BWOC, from 0.001% BWOC to 10% BWOC, from 0.001% BWOC to 5% BWOC, from 0.001% BWOC to 1% BWOC, or from 0.001% BWOC to 0.5% BWOC friction reducer.

In some embodiments of the cement composition, cement slurry may include a gas block stabilizer. In some embodiments, the gas block stabilizer may include, but is not limited to, an aminated aromatic salt, an alkyl ether sulfate, an aminated aromatic polymer, or combinations of these. In some embodiments, the cement slurry may comprise less than 10 gallons per sack of cement (gps) of gas block stabilizer. In further embodiments, the cement slurry may comprise less than or equal to 5 gps, or even less than or equal to 1 gps of gas block stabilizer. In some embodiments, the cement slurry may include 0.0 gps to 10 gps, from 0.0 gps to 5 gps, from 0.0 gps to 1 gps, from 0.1 gps to 10 gps, from 0.1 gps to 5 gps, from 0.1 gps to 1 gps, from 1 gps to 10 gps, or from 1 gps to 5 gps of gas block stabilizer.

In some embodiments, the cement slurry may include from 0.1% BWOC to 10% BWOC surfactant based on the total weight of the cement precursor. In some embodiments of the cement composition, cement slurry may include a defoamer. A defoamer or "anti-foam additive," may be added to the cement slurry to prevent frothing, foaming, and vapor entrapment that may occur during the mixing process of a cement slurry. In some embodiments, the cement slurry may comprise less than 5 gps defoamer. In further embodiments, the cement slurry may include less than or equal to 1 gps defoamer, or even less than or equal to 0.5 gps defoamer.

In some embodiments of the cement composition, cement slurry may have a density of from 65 pcf to 180 pcf, which is measured prior to adding the epoxy resin system to the cement composition. In some embodiments, the cement slurry may have a density of from 65 pcf to 160 pcf, from 65 pcf to 140 pcf, from 65 pcf to 125 pcf, from 120 pcf to 180 pcf, from 120 pcf to 160 pcf, from 120 pcf to 140 pcf, from 125 pcf to 180 pcf, from 125 pcf to 160 pcf, from 125 pcf to 140 pcf, from 140 pcf to 180 pcf, from 140 pcf to 160 pcf, or from 160 pcf to 180 pcf.

Epoxy Resin System

As previously discussed, the cement compositions include an epoxy resin system that includes at least one epoxy resin and at least one curing agent. As stated previously, adding an epoxy resin system to the cement slurry may improve zonal isolation and thus increase wellbore stability, which can then be applied at different downhole conditions. In some embodiments, the average molecular weight of the epoxy resin is from about 300 g/mol to about 2000 g/mol. The epoxy resin may include bisphenol-A-based epoxy resins, bisphenol-F-based epoxy resins, aliphatic epoxy resins, or combinations of these epoxy resins. Aliphatic epoxy resins may have formula (I):

$$(OC_2H_3)-CH_2-O-R^1-O-CH_2-(C_2H_3O) \qquad (I)$$

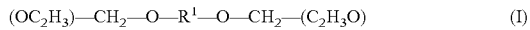

where $R^1$ may be a linear or branched hydrocarbyl having from 4 to 24 carbon atoms, such as from 4 to 20, from 4 to 16, from 4 to 12, from 4 to 8, from 6 to 24, from 6 to 20, from 6 to 16, or from 6 to 12 carbon atoms. In some embodiments, $R^1$ may be an alkyl group. For example, in one embodiment, the epoxy resin may include 1,6-hexanediol diglycidyl ether, which has formula (II):

$$(OC_2H_3)-CH_2-O-C_6H_{12}-O-CH_2-(C_2H_3O) \qquad (II)$$

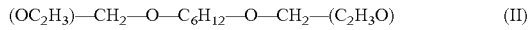

In some embodiments, the epoxy resin may include at least one of 1,6-hexanediol diclycidyl ether, alkyl glycidyl ethers having from 12 to 14 carbon atoms, 2,3-epoxypropyl o-tolyl ether, bisphenol-A-epichlorohydrin epoxy resin, or combinations of these. In other embodiments, the epoxy resin may include at least one of 1,6-hexanediol diclycidyl ether, alkyl glycidyl ethers having from 12 to 14 carbon atoms, or 2,3-epoxypropyl o-tolyl ether.

The epoxy resin may have an epoxy value of from 4.5 epoxy equivalents per kilogram of the epoxy resin to 5.5 epoxy equivalents per kilogram of the epoxy resin. The epoxy equivalent weight of an epoxy resin is the weight of the epoxy resin in grams that contains one equivalent weight of epoxy. The epoxy equivalent weight of the epoxy resin is equal to the molecular weight of the epoxy resin divided by the average number of epoxy groups in the epoxy resin. The epoxy resins may have an epoxy equivalent weight of from 170 to 350 grams of resin per epoxy equivalent (g/eq).

In some embodiments, the epoxy resin system may be modified with a reactive diluent. The type and amount of reactive diluent may influence the viscosity, flexibility, hardness, chemical resistance, mechanical properties, plasticizing effect, reactivity, crosslinking density, or other properties of the epoxy resin system. In some embodiments, the reactive diluent may be added to the epoxy resin system to change the viscosity of the epoxy resin system, such as to reduce the viscosity of the epoxy resin system. In other embodiments, the reactive diluents may be added to improve at least one of the adhesion, the flexibility, and the solvent resistance of the epoxy resin system.

The reactive diluent can be a non-functional, monofunctional, di-functional, or multi-functional reactive diluent. For example, a non-functional reactive diluent does not have an epoxide functional group. As used in relation to reactive diluents, the term "functional" refers to the reactive diluent having at least one epoxide functional group. Therefore, a functional reactive diluent may have one, two, three, or more than three epoxide functional groups. The term "non-functional," as used in relation to reactive diluents, refers to a reactive diluent that does not have at least one epoxide functional group. Thus, a non-functional reactive diluent does not have at least one epoxide functional group, but still participates in at least one chemical reaction during reaction of the epoxide resin. The term "non-reactive diluent" refers to a diluent that does not participate in a chemical reaction during reaction of the epoxy resin. Examples of reactive and non-reactive diluents may include, but are not limited to, propylene glycol diglycidyl ether, butanediol diglycidyl ether, cardanol glycidyl ether derivatives, propanetriol triglycidyl ether, aliphatic monoglycidyl ethers of $C_{13}$-$C_{15}$ alcohols, or combinations of functional or non-functional reactive diluents and non-reactive diluents.

In some embodiments, the epoxy resin system may include a reactive diluent having the formula (III):

$$R^2—O—CH_2—(C_2H_3O) \quad (III)$$

where $R^2$ is a hydrocarbyl having from 12 to 14 carbon atoms. $R^2$ may be linear, branched, or cyclic. In some embodiments, $R^2$ may be an alkyl group.

In some embodiments, the epoxy resin system may include an amount of reactive diluent that reduces the viscosity of the epoxy resin system. In other embodiments, the epoxy resin system may include an amount of reactive diluent that modifies one or more of the adhesion, the flexibility, or the solvent resistance of the epoxy resin system. In some embodiments, the epoxy resin system may include from 1 wt. % to 30 wt. % reactive diluent based on the total weight of the epoxy resin portion of the epoxy resin system.

As used in this disclosure, the term "epoxy resin portion" refers to the constituents of the epoxy resin system that do not include the curing agent, weighting agents, or other additives, such as accelerators or retarders. The epoxy resin portion includes the epoxy resins and any added reactive or non-reactive diluent. In other embodiments, the epoxy resin system may include from 1 wt. % to 20 wt. %, from 1 wt. % to 16 wt. %, from 1 wt. % to 14 wt. %, from 1 wt. % to 12 wt. %, from 5 wt. % to 30 wt. %, from 5 wt. % to 20 wt. %, from 5 wt. % to 16 wt. %, from 5 wt. % to 14 wt. %, from 5 wt. % to 12 wt. %, from 10 wt. % to 30 wt. %, from 10 wt. % to 20 wt. %, from 10 wt. % to 16 wt. %, from 10 wt. % to 14 wt. %, from 12 wt. % to 30 wt. %, from 12 wt. % to 20 wt. %, from 12 wt. % to 16 wt. %, from 14 wt. % to 30 wt. %, from 14 wt. % to 20 wt. %, or from 14 wt. % to 16 wt. % reactive diluent based on the total weight of the epoxy resin portion of the epoxy resin system.

In some embodiments, the epoxy resin system may include bisphenol-A-(epichlorohydrin) epoxy resin with oxirane mono [($C_{12}$-$C_{14}$)-alkyloxy)methyl] derivatives. The bisphenol-A-epichlorohydrin epoxy resin is an epoxy resin made by reaction of bisphenol-A and epichlorohydrin. The bisphenol-A-(epichlorohydrin) epoxy resin may then be modified with the reactive diluent oxirane mono [($C_{12}$-$C_{14}$)-alkyloxy) methyl] derivatives to reduce the viscosity of the resin and improve the adhesion, flexibility, and solvent resistance of the final resin. The bisphenol-A-(epichlorohydrin) epoxy resin with the reactive diluent oxirane mono [($C_{12}$-$C_{14}$)-alkyloxy) methyl] derivatives may modify the viscosity of the cement composition, or may provide the cement with a non-crystalizing resin and improved mechanical and chemical resistance compared to cement compositions without the bisphenol-A-(epichlorohydrin) epoxy resin with the reactive diluent oxirane mono [($C_{12}$-$C_{14}$)-alkyloxy) methyl] derivatives. In some embodiments, the epoxy resin may include from 80 wt. % to 90 wt. %, from 80 wt. % to 88 wt. %, from 80 wt. % to 86 wt. %, from 80 wt. % to 84 wt. %, from 82 wt. % to 90 wt. %, from 82 wt. % to 88 wt. %, from 82 wt. % to 86 wt. %, from 82 wt. % to 84 wt. %, from 84 wt. % to 90 wt. %, from 84 wt. % to 88 wt. %, or from 84 wt. % to 86 wt. % bisphenyl-A-epichlorohydrin epoxy resin based on the total weight of the epoxy resin portion. In some embodiments, the epoxy resin may include from 10 wt. % to 20 wt. %, from 10 wt. % to 18 wt. %, from 10 wt. % to 16 wt. %, from 10 wt. % to 14 wt. %, from 12 wt. % to 20 wt. %, from 12 wt. % to 18 wt. %, from 12 wt. % to 16 wt. %, from 12 wt. % to 14 wt. %, from 14 wt. % to 20 wt. %, from 14 wt. % to 18 wt. %, or from 14 wt. % to 16 wt. % oxirane mono[($C_{12}$-$C_{14}$)-alkyloxy)methyl] derivatives based on the total weight of the epoxy resin portion of the epoxy resin system.

In some embodiments, the epoxy resin system comprising the bisphenol-A-(epichlorohydrin) epoxy resin with the reactive diluent oxirane mono [($C_{12}$-$C_{14}$)-alkyloxy) methyl] derivatives may have an epoxy value of from 4.76 epoxy equivalents per kilogram of epoxy resin to 5.26 epoxy equivalents per kilogram of epoxy resin. The epoxy resin comprising the bisphenol-A-(epichlorohydrin) epoxy resin with the reactive diluent oxirane mono [($C_{12}$-$C_{14}$)-alkyloxy) methyl] derivatives may have an epoxy equivalent weight of 190 g/eq to 210 g/eq and a dynamic viscosity of from 600 milliPascal seconds (mPa·s) to 1200 mPa·s, or 600 mPa·s to 900 mPa·s.

In some embodiments, the epoxy resin system may include 2,3-epoxypropyl-o-tolyl ether, which may have an epoxy equivalent weight of from 170 g/eq to 190 g/eq and exhibit a dynamic viscosity of from 7 mPa·s to 10 mPa·s. In other embodiments, the epoxy resin system may include alkyl glycidyl ethers having from 12 to 14 carbon atoms, which may have an epoxy equivalent weight of from 270 g/eq to 305 g/eq and may exhibit a dynamic viscosity of from 5 mPa·s to 12 mPa·s. In some embodiments, the epoxy resin system may include 1,6-hexanediol diclycidyl ether, which may have an epoxy equivalent weight of from 150 g/eq to 170 g/eq and may exhibit a dynamic viscosity of from 20 mPa·s to 30 mPa·s.

In some embodiments, the epoxy resin system may include a plurality of epoxy resins. For example, in some embodiments, the epoxy resin system may include a combination of two or more of bisphenol-A-epichlorohydrin epoxy resin, 2,3-epoxypropyl-o-tolyl ether, $C_{12}$-$C_{14}$ alkyl glycidyl ether, or 1,6-hexanediol diglycidyl ether epoxy resin. In one embodiment, the epoxy resin system may include a mixture of 1,6-hexanediol diglycidyl ether epoxy resin and bisphenol-A-epichlorohydrin epoxy resin with the reactive diluent oxirane mono [($C_{12}$-$C_{14}$)-alkyloxy)methyl] derivatives.

In some embodiments, the epoxy resin system may include from 20 wt. % to 99 wt. % epoxy resin based on the total weight of the epoxy resin system before curing. In other embodiments, the epoxy resin system may include from 20 wt. % to 97 wt. %, from 20 wt. % to 95 wt. %, from 20 wt. % to 90 wt. %, from 20 wt. % to 80 wt. %, from 20 wt. % to 60 wt. %, from 40 wt. % to 99 wt. %, from 40 wt. % to 97 wt. %, from 40 wt. % to 95 wt. %, from 40 wt. % to 90 wt. %, from 40 wt. % to 80 wt. %, from 40 wt. % to 60 wt. %, from 60 wt. % to 99 wt. %, from 60 wt. % to 97 wt. %, from 60 wt. % to 95 wt. %, from 60 wt. % to 90 wt. %, from 60 wt. % to 80 wt. %, from 80 wt. % to 99 wt. %, from 80 wt. % to 97 wt. %, from 80 wt. % to 95 wt. %, from 80 wt. % to 90 wt. %, from 90 wt. % to 99 wt. %, from 90 wt. % to 97 wt. %, or from 90 wt. % to 95 wt. % epoxy resin based on the total weight of the epoxy resin system before curing.

As previously discussed in this disclosure, the epoxy resin system includes a curing agent to cure the epoxy resin. The curing agent may include at least one of an amine, polyamine, amine adduct, polyamine adduct, alkanolamine, amide, polyamide, polyamide adduct, polyamide imidazoline, polyaminoamides, phenalkamine, or combinations of these. Amines or polyamine curing agents may include, but are not limited to, aromatic amines, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, or amine adducts such as cycloaliphatic amine adducts or polyamine adducts.

In some embodiments, the curing agent may include at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), or combinations of these. In other embodiments, the curing agent may include at least one of DETA, TETA, TEPA, IPDA, or combinations of these. In some embodiments, the epoxy resin system may include a plurality of curing agents.

The curing agent may be an amine curing agent having an amine value that enables the amine curing agent to fully cure the epoxy resin system. The amine value of a curing agent gives the active hydrogen (NH) content of an amine curing agent. The amine value is expressed as the weight in milligrams of potassium hydroxide (KOH) needed to neutralize the NH in 1 gram of the amine curing agent. In some embodiments, the curing agent may have an amine value of from 250 milligrams of KOH per gram (mg KOH/g) to 1700 mg KOH/g, from 250 mg KOH/g to 1650 mg KOH/g, from 250 mg KOH/g to 1600 mg KOH/g, from 450 mg KOH/g to 1700 mg KOH/g, from 450 mg KOH/g to 1650 mg KOH/g, from 450 mg KOH/g to 1600 mg KOH/g, from 650 mg KOH/g to 1700 mg KOH/g, from 650 mg KOH/g to 1650 mg KOH/g, or from 650 mg KOH/g to 1600 mg KOH/g. The amine value may be determined by titrating a solution of the curing agent with a dilute acid, such as a 1 N solution of hydrogen chloride (HCl). The amine value may then be calculated from the amount of HCl needed to neutralize the amine in the solution according to Equation 1 (EQU. 1):

$$\frac{V_{HCl} * N_{HCl} * MW_{KOH}}{W} \qquad \text{EQU. 1}$$

where $V_{HCl}$ is the volume in milliliters of HCl needed to neutralize the amine, $N_{HCl}$ is the normality of HCl used to titrate the amine, $MW_{KOH}$ is the molecular weight of KOH in grams per mole, and W is the weight in grams of the curing agent sample titrated. The amine number of the known pure amine curing agent may be calculated from Equation 2 (EQU. 2):

$$\frac{1000 * MW_{KOH}}{MW_{curing\ agent}} \qquad \text{EQU. 2}$$

where $MW_{KOH}$ is the molecular weight of KOH in grams per mole, and $MW_{curing\ agent}$ is the molecular weight of the curing agent in grams per mole.

The amine curing agent may have an amine hydrogen equivalent weight (AHEW) that enables the amine curing agent to fully cure the epoxy resin system. The AHEW of an amine curing agent refers to the grams of the amine curing agent containing 1 equivalent of amine. The AHEW of an amine curing agent may be calculated by dividing the molecular weight of the amine curing agent in grams per mole by the number of active hydrogens per molecule. In some embodiments, the curing agent may be an amine curing agent having an AHEW of from 20 grams (g) to 120 g, from 20 g to 115 g, from 20 g to 110 g, from 20 g to 100 g, from 40 g to 120 g, from 40 g to 115 g, from 40 g to 110 g, from 40 g to 110 g, from 60 g to 120 g, from 60 g to 115 g, or from 60 g to 110 g determined according to the methods previously described in this disclosure.

In some embodiments, the cement composition may include an amount of the curing agent capable of curing the epoxy resin system to a semi-solid state within a cure time of from less than 12 hours. In some embodiments, the cement composition may include from 0.1 wt. % to 20 wt. % curing agent based on the total weight of the epoxy resin system before curing. In other embodiments, the cement composition may have from 0.1 wt. % to 15 wt. %, from 0.1 wt. % to 10 wt. %, from 0.1 wt. % to 5 wt. %, from 0.5 wt. % to 20 wt. %, from 0.5 wt. % to 15 wt. %, from 0.5 wt. % to 10 wt. %, from 0.5 wt. % to 5 wt. %, from 1 wt. % to 20 wt. %, from 1 wt. % to 15 wt. %, from 1 wt. % to 10 wt. %, from 1 wt. % to 5 wt. %, from 5 wt. % to 20 wt. %, from 5 wt. % to 15 wt. %, from 5 wt. % to 10 wt. %, or from 10 wt. % to 20 wt. % curing agent based on the total weight of the epoxy resin system before curing.

The epoxy resin system may also include one or more additives to modify the speed of the reaction between the epoxy resin and the curing agent or modify other properties of the resin system, such as viscosity or yield point or other rheological properties. For example, in some embodiments, the epoxy resin system may include an accelerator or a retarder to speed up or slow down the reaction between the epoxy resin and the curing agent. Accelerators may include, but are not limited to, alcohols, phenols, aminoalcohols, or amines. Examples of accelerators may include, but are not limited to, benzyl alcohol, mono-nonylphenol, triethanolamine (TEA), amino-n-propyl diethanolamine, n,n-dimethyldipropylenetramine, or combinations of these. Examples of retarders may include lignin, gums, starches, lignosulphonate derivatives, or combinations of these.

According to some embodiments, the epoxy resin system may include from 20 weight percent to 97 weight percent epoxy resin based on the total weight of the epoxy resin system, the epoxy resin comprising at least one of 2,3-epoxypropyl o-tolyl ether, alkyl glycidyl ethers having from 12 to 14 carbon atoms, or a compound having Formula (I):

$$(OC_2H_3)\text{—}CH_2\text{—}O\text{—}R^1\text{—}O\text{—}CH_2\text{—}(C_2H_3O) \qquad \text{(I)}$$

where $R^1$ is a linear or branched hydrocarbyl having from 4 to 24 carbon atoms. The epoxy resin system may also include from 1 weight percent to 20 weight percent curing agent based on the total weight of the epoxy resin system.

According to other embodiments, the epoxy resin system may include from 20 weight percent to 97 weight percent epoxy resin based on the total weight of the epoxy resin system, the epoxy resin comprising bisphenol-A-epichlorohydrin epoxy resin and a reactive diluent having formula $R^2\text{—}O\text{—}CH_2\text{—}(C_2H_3O)$, where $R^2$ is hydrocarbyl having from 12 to 14 carbon atoms. The composition may also include from 1 weight percent to 20 weight percent curing agent based on the total weight of the composition.

The epoxy resin comprising at least one of alkyl glycidyl ethers having from 12 to 14 carbon atoms, 2,3-epoxypropyl o-tolyl ether, a bisphenol-A-epichlorohydrin epoxy resin, or a compound having Formula (I):

$$(OC_2H_3)\text{—}CH_2O\text{—}R^1\text{—}O\text{—}CH_2\text{—}(C_2H_3O) \qquad \text{(I)}$$

where $R^1$ is a hydrocarbyl having from 4 to 24 carbon atoms, where the epoxy resin has an epoxy equivalent weight of from 170 to 350 epoxy equivalents per gram. The epoxy resin system may also include from 1 weight percent to 20 weight percent curing agent based on the total weight of the epoxy resin system. In some embodiments, the epoxy resin system may have a viscosity less than the viscosity of the cement slurry so that combining the epoxy resin system, before curing, with the cement slurry reduces the overall viscosity of the cement composition. The reduction in the viscosity of the cement composition through addition of the epoxy resin system may enable the cement composition to be transferred into the annulus between the exterior surface of the tubular string and the wellbore wall or the interior surface of a casing surrounding the tubular string. The reduction in the viscosity of the cement composition through addition of the epoxy resin system may also enable the cement composition having the epoxy resin to be introduced into a remediation area, such as a lost circulation zone or a narrow fracture gradient zones. In some embodiments, the epoxy resin system may have a viscosity of from 200 millipascal seconds (mPa·s) to 50,000 mPa·s, from 200 mPa·s to 20,000 mPa·s, from 200 mPa·s to 15,000 mPa·s, from 200 mPa·s to 10,000 mPa·s, from 200 mPa·s to 5,000 mPa·s, from 200 mPa·s to 2,000 mPa·s, from 500 mPa·s to 50,000 mPa·s, from 500 mPa·s to 20,000 mPa·s, from 500 mPa·s to 15,000 mPa·s, from 500 mPa·s to 10,000 mPa·s, from 500 mPa·s to 5,000 mPa·s, from 500 mPa·s to 2,000 mPa·s, from 1000 mPa·s to 50,000 mPa·s, from 1000 mPa·S to 20,000 mPa·s, from 1000 mPa·s to 15,000 mPa·s, from 1000 mPa·s to 10,000 mPa·s, from 1000 mPa·s to 5,000 mPa·s, or from 1000 mPa·s to 2,000 mPa·s as measured immediately after mixing the curing agent with the epoxy resin and before combining with the cement slurry.

The mechanical properties of the cement composition may make the cement composition less brittle and provide a greater deformation capacity compared to conventional cement compositions. In addition, the cement compositions that include the epoxy resin system, prior to curing, may have rheological properties that enable the cement compositions with the epoxy resin system to transmit hydrostatic pressure to the formation during the primary sealing process to support the wellbore walls and reduce or prevent fluid flow from the subterranean hydrocarbon-bearing formation into the wellbore. The cement compositions that include the epoxy resin system can be used in remedial operations to provide effective zonal isolation and to repair casing-casing annular leaks.

In some embodiments, the cement composition may include an amount of the accelerator capable of decreasing the cure time of the cement composition. In some embodiments, the cement composition may include from 0.01 wt. % to 10 wt. % accelerator based on the total weight of the epoxy resin system prior to curing. In other embodiments, the cement composition may include from 0.01 wt. % to 5 wt. %, from 0.01 wt. % to 3 wt. %, from 0.01 wt. % to 1 wt. %, from 0.1 wt. % to 10 wt. %, from 0.1 wt. % to 5 wt. %, from 0.1 wt. % to 3 wt. %, from 0.1 wt. % to 1 wt. %, from 1 wt. % to 10 wt. %, from 1 wt. % to 5 wt. %, or from 1 wt. % to 3 wt. % accelerator based on the total weight of the cement composition prior to curing.

Without being bound by theory, the cement compositions once cured may be more chemically resistant than conventional cement compositions because epoxy resins are corrosion resistant. For example, the fluids from the subterranean formation, such as hydrocarbon gases, crude oil, or produced water, may include hydrogen sulfide gas ($H_2S$), which is corrosive. In some embodiments, the cured epoxy resins incorporated into the cement compositions may be resistant to corrosion caused by $H_2S$ gas present in fluids in the subterranean formation.

Methods of Preparing the Cement Compositions

In some embodiments, the cement composition may be produced by preparing the cement slurry, preparing the epoxy resin system, and then adding the epoxy resin system to the cement slurry. In some embodiments, the cement slurry may be prepared separately from the epoxy resin system and the epoxy resin system added to the cement slurry to produce the cement composition just before use of the cement composition. For example, in some embodiments, the cement slurry may be prepared in a first vessel and the epoxy resin system may be prepared in a second vessel separate from the first vessel. In some embodiments, preparing the epoxy resin system may include preparing the epoxy resin portion of the epoxy resin system without the curing agent. Then, the curing agent may be added to the epoxy resin portion and mixed immediately before adding the epoxy resin system to the cement slurry to produce the cement composition. After adding the epoxy resin system to the cement slurry to produce the cement composition, the cement composition may be mixed for a period of time sufficient to produce a homogeneous mixture. In some embodiments, the cement composition may be mixed for a period of from 10 minutes to 50 minutes, or about 30 minutes.

In some embodiments, the cement composition may include from 0.1 wt. % to 99 wt. % cement slurry based on the total weight of the cement composition. In other embodiments, the cement composition may include from 0.1 wt. % to 95 wt. %, from 0.1 wt. % to 90 wt. %, from 0.1 wt. % to 75 wt. %, from 0.1 to 50 wt. %, from 0.1 wt. % to 25 wt. %, from 0.1 wt. % to 10 wt. %, from 1 wt. % to 99 wt. %, from 1 wt. % to 95 wt. %, from 1 wt. % to 90 wt. %, from 1 wt. % to 75 wt. %, from 1 wt. % to 50 wt. %, from 10 wt. % to 99 wt. %, from 10 wt. % to 95 wt. %, from 10 wt. % to 90 wt. %, from 10 wt. % to 75 wt. %, from 10 wt. % to 50 wt. %, from 25 wt. % to 99 wt. %, from 25 wt. % to 95 wt. %, from 25 wt. % to 90 wt. %, from 25 wt. % to 75 wt. %, from 50 wt. % to 99 wt. %, from 50 wt. % to 95 wt. %, from 50 wt. % to 90 wt. %, or from 50 wt. % to 75 wt. % cement slurry based on the total weight of the cement composition.

In some embodiments, the cement composition may include an amount of the epoxy resin system sufficient to prevent or reduce the formation of micro-cracks in the cement composition when subjected to temperature and pressure cycling. In some embodiments, the cement composition may include an amount of the epoxy resin system sufficient to reduce the viscosity of the cement composition to enable the cement composition to be injected into a narrow fracture pressure gradient zone. In some embodiments, the cement composition may include from 0.1 wt. % to 99 wt. % epoxy resin system based on the total weight of the cement composition. In other embodiments, the cement composition may include from 0.1 wt. % to 90 wt. %, from 0.1 wt. % to 75 wt. %, from 0.1 to 50 wt. %, from 0.1 wt. % to 25 wt. %, from 0.1 wt. % to 10 wt. %, from 1 wt. % to 99 wt. %, from 1 wt. % to 90 wt. %, from 1 wt. % to 75 wt. %, from 1 wt. % to 50 wt. %, from 1 wt. % to 25 wt. %, from 1 wt. % to 10 wt. %, from 10 wt. % to 99 wt. %, from 10 wt. % to 90 wt. %, from 10 wt. % to 75 wt. %, from 10 wt. % to 50 wt. %, from 10 wt. % to 25 wt. %, from 25 wt. % to 99 wt. %, from 25 wt. % to 90 wt. %, from 25 wt. % to 75 wt. %, from 50 wt. % to 99 wt. %, 50 wt. % to 90 wt. %, or from 50 wt. % to 75 wt. % epoxy resin system based on the total weight of the cement composition.

The amount of each component of the epoxy resin system may also be expressed in terms of the gallons of epoxy resin or curing agent per sack of cement precursor (gps) in accordance with industry practice. For example, in some embodiments, the cement composition may include from 0.1 gps to 5 gps epoxy resin portion of the epoxy resin system. As previously described, the epoxy resin portion of the epoxy resin refers to the constituents of the epoxy resin system that do not include the curing agent, weighting agents, or other additives, such as accelerators or retarders. In some embodiments, the cement composition may include from 0.1 gps to 4 gps, from 0.1 gps to 3 gps, frp, 0.1 gps to 2 gps, from 0.1 gps to 1 gps, from 0.5 gps to 5 gps, from 0.5 gps to 4 gps, from 0.5 gps to 3 gps, from 0.5 gps to 2 gps, from 0.5 gps to 1 gps, from 1 gps to 5 gps, from 1 gps to 4 gps, from 1 gps to 3 gps, or from 1 gps to 2 gps epoxy resin portion of the epoxy resin system. In some embodiments, the cement composition may include from 0.6 gps to 0.9 gps or 0.7 gps to 0.9 gps epoxy resin portion of the epoxy resin system. In some embodiments, the cement composition may include an amount of the curing agent sufficient to cure the epoxy resin of the epoxy resin system. In some embodiments, the cement composition may include from 0.01 gps to 1 gps, from 0.01 gps to 0.5 gps, from 0.01 gps to 0.1 gps, from 0.05 gps to 1 gps, from 0.05 gps to 0.5 gps, from 0.05 gps to 0.1 gps, from 0.1 gps to 1 gps, from 0.1 gps to 0.5 gps, or from 0.5 gps to 1 gps curing agent.

In some embodiments, the cement composition may include from 0.1 wt. % to 99 wt. % epoxy resin portion of the epoxy resin system based on the total weight of the cement composition. In other embodiments, the cement composition may include from 0.1 wt. % to 90 wt. %, from 0.1 wt. % to 75 wt. %, from 0.1 to 50 wt. %, from 0.1 wt. % to 25 wt. %, from 0.1 wt. % to 10 wt. %, from 1 wt. % to 99 wt. %, from 1 wt. % to 90 wt. %, from 1 wt. % to 75 wt. %, from 1 wt. % to 50 wt. %, from 1 wt. % to 25 wt. %, from 1 wt. % to 10 wt. %, from 10 wt. % to 99 wt. %, from 10 wt. % to 90 wt. %, from 10 wt. % to 75 wt. %, from 10 wt. % to 50 wt. %, from 10 wt. % to 25 wt. %, from 25 wt. % to 99 wt. %, from 25 wt. % to 90 wt. %, from 25 wt. % to 75 wt. %, from 50 wt. % to 99 wt. %, 50 wt. % to 90 wt. %, or from 50 wt. % to 75 wt. % epoxy resin portion of the epoxy resin system based on the total weight of the cement composition. In some embodiments, the cement composition may include from 0.1 wt. % to 20 wt. %, from 0.1 wt. % to 15 wt. %, from 0.1 wt. % to 10 wt. %, from 0.1 wt. % to 5 wt. %, from 0.5 wt. % to 20 wt. %, from 0.5 wt. % to 15 wt. %, from 0.5 wt. % to 10 wt. %, from 0.5 wt. % to 5 wt. %, from 1 wt. % to 20 wt. %, from 1 wt. % to 15 wt. %, from 1 wt. % to 10 wt. %, from 1 wt. % to 5 wt. %, from 5 wt. % to 20 wt. %, from 5 wt. % to 15 wt. %, from 5 wt. % to 10 wt. %, or from 10 wt. % to 20 wt. % curing agent based on the total weight of the cement composition before curing.

In some embodiments, before introducing the cement composition to the wellbore and before any substantial curing has taken place, the cement composition may have a plastic viscosity (PV) of from about 1 to about 200 when measured at about 70° F. to about 300° F. (about 21° C. to about 149° C.) according to the test methods provided subsequently in this disclosure. In other embodiments, the cement composition may have a PV of from about 1 to about 150, from about 1 to about 100, about 1 to about 50, about 50 to about 200, about 50 to about 150, about 50 to about 100, about 100 to about 200, about 100 to about 150, about 140 to about 200, or about 150 to about 200 when measured at about 70° F. to about 300° F. (about 21° C. to about 149° C.) according to the test methods provided subsequently in this disclosure. For example, the cement composition may have a plastic viscosity (PV) of from 140 to 200 when measured at 181° F. (about 83° C.) according to the test methods provided subsequently in this disclosure.

In some embodiments, before introducing the cement composition to the wellbore and before any substantial curing has taken place, the cement composition may have a yield point (YP) of 1 to about 200 when measured at about 70° F. to about 300° F. (about 21° C. to about 149° C.) according to the test methods provided subsequently in this disclosure. In other embodiments, the cement composition may have a YP of from about 1 to about 150, from about 1 to about 100, about 1 to about 50, about 50 to about 200, about 50 to about 150, about 50 to about 100, about 100 to about 200, about 100 to about 150, about 140 to about 200, or about 150 to about 200 when measured at about 70° F. to about 300° F. (about 21° C. to about 149° C.) according to the test methods provided subsequently in this disclosure. For example, in some embodiments, the cement composition may have a YP of from 10 to 30 when measured at 181° F. (about 83° C.) according to the test methods provided subsequently in this disclosure. In other embodiments, the cement composition may have a YP of from 15 to 30 or from 25 to 30 when measured at 181° F. (about 83° C.) according to the test methods provided subsequently in this disclosure.

In some embodiments, before introducing the cement composition to the wellbore and before any substantial curing has taken place, the cement composition may have a fluid loss of from 0 to 400 cubic centimeters per 30 minutes ($cm^3$/30 min) measured according to the test methods provided subsequently in this disclosure. In some embodiments, before introducing the cement composition to the wellbore and before any substantial curing has taken place, the cement composition may have a fluid loss of from 0 to about 350 $cm^3$/30 min, from about 0 $cm^3$/30 min to about 300 $cm^3$/30 min, from about 0 $cm^3$/30 min to about 250 $cm^3$/30 min, from about 0 $cm^3$/30 min to about 200 $cm^3$/30 min, from about 0 $cm^3$/30 min to about 150 $cm^3$/30 min, from about 0 $cm^3$/30 min to about 100 $cm^3$/30 min, from about 0 $cm^3$/30 min to about 50 $cm^3$/30 min, from about 50 $cm^3$/30 min to about 400 $cm^3$/30 min, from about 50 $cm^3$/30 min to about 350 $cm^3$/30 min, from about 50 $cm^3$/30 min to about 300 $cm^3$/30 min, from about 50 $cm^3$/30 min to about 250 $cm^3$/30 min, from about 50 $cm^3$/30 min to about 200 $cm^3$/30 min, from about 50 $cm^3$/30 min to about 150 $cm^3$/30 min, from about 50 $cm^3$/30 min to about 100 $cm^3$/30 min, from about 100 $cm^3$/30 min to about 400 $cm^3$/30 min, from about 100 $cm^3$/30 min to about 350 $cm^3$/30 min, from about 100 $cm^3$/30 min to about 300 $cm^3$/30 min, from about 100 $cm^3$/30 min to about 250 $cm^3$/30 min, from about 100 $cm^3$/30 min to about 200 $cm^3$/30 min, from about 100 $cm^3$/30 min to about 150 $cm^3$/30 min, from about 200 $cm^3$/30 min to about 400 $cm^3$/30 min, from about 200 $cm^3$/30 min to about 350 $cm^3$/30 min, from about 200 $cm^3$/30 min to about 300 $cm^3$/30 min, from about 300 $cm^3$/30 min to about 400 $cm^3$/30 min, or from about 350 $cm^3$/30 min to about 400 $cm^3$/30 min.

In some embodiments, prior to curing the cement composition, the free fluid of the cement composition is less than or equal to 10%, less than or equal to 5%, less than or equal to 3%, less than or equal to 2%, less than or equal to 1%, or even less than or equal to 0.1% measured according to the test methods provided subsequently in this disclosure. For example, in some embodiments, prior to curing the cement composition, the free fluid of the cement composition is about 0%.

In some embodiments, the cement composition may have a thickening time of from 0.1 hours to 24 hours hours according to the test methods provided subsequently in this disclosure. In some embodiments, the cement composition may have a thickening time of from 0.1 hours to 24 hours, from 0.1 hours to 12 hours, from 0.1 hours to 6 hours, from 1 hour to 24 hours, from 1 hour to 12 hours, from 1 hour to 6 hours, from 6 hours to 24 hours, from 6 hours to 12 hours, or from 12 hour to 24 hours. For example, in some embodiments when the density of the cement composition is about 140 pcf, the cement composition may have a thickening time of from 0.1 hours to 24 hours, from 0.1 hours to 12 hours, from 0.1 hours to 6 hours, from 1 hour to 24 hours, from 1 hour to 12 hours, from 1 hour to 6 hours, from 6 hours to 24 hours, from 6 hours to 12 hours, or from 12 hour to 24 hours. For example, in some embodiments where the density of the cement composition is about 125 pcf, the cement composition may have a thickening time of from 0.1 hours to 24 hours, 0.1 hours to 12 hours, from 0.1 hours to 6 hours, from 1 hour to 24 hours, from 1 hour to 12 hours, from 1 hour to 6 hours, from 6 hours to 24 hours, from 6 hours to 12 hours, or from 12 hour to 24 hours.

In some embodiments, the cement composition may have a cure time of from 0.1 hours to 48 hours. In some embodiments, the cement composition may have a cure time of from 0.1 hours to 24 hours, from 0.1 hours to 12 hours, from 0.1 hours to 6 hours, from 1 hour to 48 hours, from 1 hour to 24 hours, from 1 hour to 12 hours, from 1 hour to 6 hours, from 6 hours to 48 hours, from 6 hours to 24 hours, from 6 hours to 12 hours, from 12 hours to 48 hours, from 12 hour to 24 hours, or from 24 hours to 48 hours. In some embodiments, the cement composition may have a cure time of greater than 4 hours. In some embodiments, the cement composition may have a cure time of less than 48 hours.

Methods of Using the Cement Compositions

Methods of using the cement compositions for sealing an annulus or remediating a lost circulation zone of a wellbore are also described in the present disclosure. In some embodiments, a method may include introducing the cement composition to a lost circulation zone or annulus, curing the cement composition to form a cured cement composition, where the cured cement composition seals the lost circulation zone or annulus. The cement compositions may have any of the properties or compositions previously described in this disclosure. In some embodiments, the method may include introducing the cement composition to a wellbore annulus or a casing-to-casing annulus, and curing the cement composition to seal the wellbore annulus or the casing-to-casing annulus. In some embodiments, the method may include introducing the cement composition to a portion of the wellbore experiencing casing-casing annulus pressure increase or damage caused by annulus pressure to remediate the portion of the wellbore.

The cement compositions may be used for sealing the annulus or remediating a wellbore under a range of different downhole conditions in the wellbore. For example, in some embodiments, the cement compositions may be adapted to different downhole conditions by changing the concentrations of the epoxy resin, curing agents, accelerators, or weighting materials in the cement composition to modify the specific gravity, viscosity, mechanical properties, curing time, or other properties of the cement composition.

In some circumstances, the cement compositions may be incompatible with the drilling fluid. Therefore, in some embodiments, the method may include introducing a spacer fluid before introducing the cement composition. For example, to commence primary sealing, the spacer fluid may first be pumped into the interior volume of the tubular string to displace the drilling fluid and provide a buffer between the drilling fluid and the cement composition. Various washing fluids or pre-flush fluids may also be introduced to the interior volume of the tubular string before or after the spacer fluid. Washing fluids may be used to remove films and residue from the surfaces of the tubular string and wellbore wall. A fixed amount of the cement composition may then be pumped into the internal volume of the tubular string after the spacer fluid. The fixed amount of the cement composition may be an amount that fills the annulus, such as the wellbore annulus, casing-casing annulus, or both. A downhole plug may be used between the spacer fluid and cement composition, and an uphole plug may be inserted after the cement composition.

In some embodiments, the method may further include introducing a displacement fluid into the wellbore to transfer the cement composition into an annulus of the well and curing the cement composition. A displacement fluid may be pumped into the interior volume of the tubular string after the uphole plug to force the cement composition to the downhole end of the tubular string, around the downhole edge of the tubular string, and into the annulus. A displacement fluid may also be referred to as a flush fluid. The displacement fluid is pumped into the interior volume of the tubular string until all of the cement composition is disposed within the annulus. Cooperation of the downhole plug and the uphole plug may operate to maintain the cement composition in the annulus.

The cement composition may then be allowed to cure to form a barrier between the tubular string and the wellbore wall, between the tubular string and an outer tubular string, or both. When the cement composition cures, the cement composition physically and chemically bonds with both the exterior surface of the tubular string and the wellbore wall or interior surface of the outer casing surrounding the tubular string, coupling the tubular string to the wellbore wall or the outer casing. This fluid isolation does not permit fluid migration through the cement composition to the interior of the well or uphole to the surface.

In addition to primary sealing, remedial sealing may be performed using the cement compositions. In remedial sealing, the cement composition may be introduced to specific locations within the wellbore to repair the wellbore, such as to repair sections of the wellbore in which micro-cracks have formed in the annuli or in which increased casing-casing annulus pressure has caused damage to the tubular strings. Remedial sealing may also include injecting the cement composition into the wellbore for purposes of sealing the wellbore in preparation for abandonment. In some situations, remedial sealing may include the process of "squeezing," in which the cement composition is forced against the inner surface of the portion of the well to be remediated, such as the inner surface of the innermost tubular string. As the cement composition is forced against the inner surface of the tubular string or wellbore wall, liquid portions of the cement composition may be "squeezed" into the microcracks, or into the formation in the case of remediating the wellbore wall. For conventional cement compositions, the solids may form a layer on the inner surface of the tubular string.

While drilling the wellbore, the drilling operation may encounter a lost circulation zone. In a lost circulation zone, drilling fluid, cement compositions, or both flow from the wellbore into the subterranean formation, resulting in loss of the drilling fluid or cement composition from the drilling process. In some instances, lost circulation may be caused by the natural state of the formation through which the drilling passes. For example, the subterranean formation may be naturally fractured or may be an unconsolidated formation, such as gravel, sand, pea, or other unconsolidated material. Alternatively, in other situations, the hydrostatic pressure of the drilling fluid or cement composition may be greater than the fracture gradient of the subterranean formation, which may cause the at least some breakdown of the pores in the formation. If the pores in the formation breakdown enough, then the pores may become large enough in size to receive the fluids from the wellbore rather than resisting flow of these fluids.

Lost circulation zones may be remediated by introducing a material into the formation in the lost circulation zone to seal the lost circulation zone from the wellbore. The material may be injected into the formation or squeezed into the formation. Conventional lost circulation materials (LCM) can include bridging material, fibrous material, flaky material, cement such as low-cure-time cement, and other materials having different particle sizes. Conventional lost circulation materials may include calcium carbonate, drilling cements, paper, cottonseed hulls, nutshells, or other similar materials. These materials may be effective at mediating many lost circulation zones by forming a layer of solids over the formation at the lost circulation zone. However, these materials are not effective for use as LCM in low-injectivity zones because the greater viscosity of these conventional LCM materials may prevent these materials from being injected into the formation or reduce the depth to which these materials may be injected.

Low-injectivity zones are zones having an injectivity factor of greater than 4000 pounds of force per square inch minute per barrel (psi-min/bbl), or even greater than 6000 psi-min/bbl. As used in this disclosure, the term "barrel" refers to a unit of measure equal to 42 U.S. Gallons. The injectivity factor is defined as the quotient of the injection pressure in pounds of force per square inch (psi) divided by the injection rate in barrels per minute (bbl/min). These low-injectivity zones may include, but are not limited to, tight fractures comprising very narrow microcracks from the wellbore into the subterranean formation and areas in which the annular distance between casings is tight. In low-injectivity zones, the average width of the microcracks in the formation or the annular distance between casings may be less than 100 microns, such as less than 50 microns, or even less than 10 microns.

In these low-injectivity zones, solids particles in the cement composition or other material compositions may settle, causing blockage, which may prevent cement or other compositions from being injected into the zone. For example, wellbore cements without epoxy resin systems and other conventional materials for remediating lost circulation zones include concentrations of solids and viscosities that prevent the wellbore cement or material from being injectable into low-injectivity zones. Low-injectivity zones also require the use of materials with viscosities that allow for deeper penetration and improved wellbore isolation when mixed with cement.

In still other embodiments, a method for repairing a weak zone in a hydrocarbon production well may include perforating at least one tubular string in the weak zone of the hydrocarbon production well and injecting the cement composition through the tubular string and into the weak zone of the hydrocarbon production well. The cement composition may include any of the cement compositions previous described in this disclosure. The method may further include curing the cement composition.

The cement compositions described in this disclosure may also be used in methods for primary sealing an annulus of a wellbore or in methods of remediating or repairing weak zones of a cement sheath of an existing hydrocarbon production well. Weak zones may be identified from a well log generated from physical measurement of the wellbore by one or a plurality of instruments inserted into the wellbore. In some embodiments, a method for sealing an annulus of a wellbore may include introducing a spacer fluid into a tubular string positioned in the wellbore, the spacer fluid displacing at least a portion of a drilling fluid disposed in the wellbore. The method may also include introducing a cement composition into the tubular string positioned in the wellbore to displace at least a portion of the spacer fluid. The cement composition may include any of the cement compositions previously described in this disclosure. The method may further include introducing a displacement fluid into the wellbore to transfer the cement composition into an annulus of the well and curing the cement composition.

In some embodiments, the method may further include curing the cement composition for 0.1 hours to 48 hours. Alternatively, in other embodiments, the method may include curing the cement composition for 0.1 hours to 24 hours, from 0.1 hours to 12 hours, from 0.1 hours to 6 hours, from 1 hour to 48 hours, from 1 hour to 24 hours, from 1 hour to 12 hours, from 1 hour to 6 hours, from 6 hours to 48 hours, from 6 hours to 24 hours, from 6 hours to 12 hours, from 12 hours to 48 hours, from 12 hour to 24 hours, or from 24 hours to 48 hours. In some embodiments, the cement composition may have a cure time of greater than 4 hours. In some embodiments, the cement composition may have a cure time of less than 48 hours.

In some embodiments, the method may further include identifying the weak zone of a cement sheath of the hydrocarbon production well. In some embodiments, the weak zones of a cement sheath may be identified by examining the cement bond log. The cement bond log refers to documentation of the integrity of the cement seal placed in the wellbore annulus or casing-casing annulus of the wellbore and may be generated using a sonic resonance tool or other tool to evaluate the bonding of the cement composition in the annuli. Additionally, in some embodiments, the method may include determining the volume and densities of the spacer fluid, preflush fluid, or both. The method may further include determining the density, volume, or both of the cement composition to be injected into the weak zones.

Test Methods

Viscosity

The viscosity of the cement compositions may be measured using a standard oilfield viscometer, such as a FANN® Model 35 viscometer manufactured by Fann Instrument Company for example, according to test methods provided in the API Recommended Practice For Cementing (RP 10B). The viscosity is reported as shear stress in units of pounds of force per 100 square feet (lbf/100 ft$^2$). The viscometer may also be used to measure the shear rate of the cement compositions.

Gel Strength

The gel strength refers to the shear stress of the cement composition measured at a reduced shear rate following a defined period of time during which the cement composition is maintained in a static state. The shear stress of the composition at reduced shear rate may be measured using a standard oilfield viscometer, such as a FANN® Model 35 viscometer operated at reduced rotations per minute ("rpms"), such as at 3 rpm, according to the test methods described in API Recommended Practice On Determining the Static Gel Strength of Cement Formulations (RP 10B-

6/ISO 10426-6:2008). To measure the gel strength, the cement composition is first stirred by contacting the composition with the spindle of the viscometer and operating the viscometer at 600 rotations per minute (rpm). The viscometer is then turned off for a period of time (time period). For a 10-second gel strength the time period is 10 seconds, and for a 10-minute gel strength the time period is 10 minutes. It should be understood that other time periods for measuring gel strength may be used as reference times for measurements of gel strength. During the time period, the composition comes to rest in a static state. Upon expiration of the time period, the viscometer is turned back on at a reduced speed, such as 3 rpm for example, to generate a reduced shear rate. The viscometer reading is then taken. The gel strength of the cement composition is reported in units of pounds of force per 100 square feet (lbf/100 ft$^2$).

Rheology

The rheology of the cement compositions may be modeled based on Bingham plastic flow behavior. In particular, the cement compositions may behave as a rigid body at lesser shear stress but flow as a viscous fluid at greater shear stress. The rheological behavior of the cement compositions may be determined by measuring the shear stress on the composition at different shear rates, which may be accomplished by measuring the shear stress, the shear rate, or both on the composition using a FANN® Model 35 viscometer operated at 3 rpm, 6 rpm, 100 rpm, 200 rpm, 300 rpm, or 600 rpm, for example. The rheology of the cement compositions may be evaluated from the plastic viscosity (PV) and the yield point (YP), which are parameters from the Bingham plastic rheology model. The PV is related to the resistance of the composition to flow due to mechanical interaction between the solids of the composition and represents the viscosity of the composition extrapolated to infinite shear rate. The PV reflects the type and concentration of the solids, such as weighting materials, in the cement compositions, and a lesser PV is preferred. The PV of the cement compositions may be estimated by measuring the shear stress of the composition using a FANN® Model 35 viscometer at spindle speeds of 300 rotations per minute (rpm) and 600 rpm and subtracting the 300 rpm viscosity measurement from the 600 rpm viscosity measurement according to Equation 3 (EQU. 3), which is subsequently provided. The PV values determined for the cement compositions are provided in this disclosure in units of centipoise (cP).

$$PV=\text{(viscosity at 600 rpm)}-\text{(viscosity at 300 rpm)} \quad \text{EQU. 3}$$

At shear stress less than the YP of the cement composition, the cement composition behaves as a rigid body, and at shear stress greater than the YP of the cement composition, the cement composition flows as a viscous fluid. In other words, the YP represents the amount of stress required to move a fluid from a static condition. The YP is determined by extrapolating the Bingham plastic rheology model to a shear rate of zero. The YP of the cement composition may be estimated from the PV from EQU. 3 by subtracting the PV from the shear stress measured at 300 rpm according to Equation 4 (EQU. 4), which is provided subsequently.

$$YP=\text{(300 rpm reading)}-PV \quad \text{EQU. 4}$$

The YP is expressed as a force per area, such as pounds of force per one hundred square feet (lbf/100 ft$^2$) for example. The methods for measuring and determining PV and YP for the cement compositions are consistent with methods conventionally used for drilling fluids in general.

Shear Bond Test

A shear bond test determines the force required to move a pipe through a column of set cement, which is the cement composition after curing. This shear bond strength can be used to determine the length of pipe a column of set cement can support. The shear bond test includes filling an annulus between two pieces of pipe with a cement composition and letting it set (cure). After the cement composition sets, the outer pipe is supported on the bottom platen of a load press while force is applied to the center pipe by the load press. The load indication on the press increase until the bond breaks between the pipe and the cement composition. This loading force is converted to a force per unit area and is called the shear bond strength.

Preparing the Shear Bond Test Mold: The shear bond test mold includes a bottom pipe-centering device, an outer sleeve, an inner pipe, and a top centering device. When assembled, the shear bond mold defines an annular space between the outer sleeve and the inner pipe. All pieces of the shear bond test mold are thoroughly cleaned before assembling the pieces for testing. Care should be taken to make sure the inner pipe and the outer sleeve do not have any mold release agents, such as oil or grease, in the areas in which the cement composition will contact. After cleaning, the bottom pipe-centering device is installed in the bottom of the outer sleeve. O-rings may be used to seal the inner pipe and the outer sleeve. The inner pipe is installed in the bottom pipe-centering device and aligned with the outer sleeve such that the inner pipe and the outer sleeve are concentric.

Filling the Test Mold: The cement composition is prepared and mixed according to standard American Petroleum Institute (API) procedures (or appropriate procedures for specialized slurries). The cement composition, in the form of a slurry, is then poured into the annular space between the inner and outer pipe, while slowly stirring the slurry of cement composition with a spatula to minimize the possibility of settling. The slurry of cement composition is then paddled with a glass rod or spatula to remove any trapped air and the top centering device is placed on top of the slurry and in contact with the inner pipe and outer sleeve to center the inner pipe with respect to the outer sleeve. The bottom centering device and the top centering device cooperate to maintain the inner pipe center relative to the outer sleeve while the cement composition cures or sets.

Curing the Cement Composition: The shear bond test mold filled with the cement composition slurry is then placed in the curing medium which can be a water bath or a pressure-curing chamber. The cement composition is then cured according to the appropriate test conditions in the same manner as for curing a compressive strength specimen. Before the end of the curing time, the test specimens are removed from the water bath, one at a time, and, as quickly as possible, the following are performed: (1) remove the top centering device from the curing mold; (2) remove the bottom centering device from the mold; (3) determine the height of the cement composition in contact with the inner pipe; and (4) place the test specimen back into the water bath and let the temperature stabilize for approximately 30 minutes before testing for shear bond strength. At the end of the curing period, the specimen should be maintained at the lesser of the curing temperature or a temperature of from 170 degrees Fahrenheit (° F.) (77 degrees Celsius (° C.)) to 190° F. (88° C.) until the specimen is tested. The specimen should not be allowed to cool to room temperature because cooling to room temperature may cause thermal shrinkage of the specimen and mold, which can alter the test results. If the specimen is cured using a pressure-curing vessel, the pressure-curing vessel can be cooled to a temperature of from 170° F. (77° C.) and 190° F. (88° C.) and, if necessary, the test specimens can be removed from the pressure-curing vessel and placed into a water bath of the same temperature until the time of testing.

Testing for Shear Bond Strength: The press is adjusted so that the specimen fits between the top and bottom loading platens of the press. The test specimen is removed from the water bath and quickly placed between the loading platens with the outer sleeve in contact with the bottom loading platen and the inner pipe in contact with the upper loading platen. A loading force is applied to the test specimen by the press at a uniform rate (as in testing for compressive strength). When the shear bond breaks, the inner pipe moves downward through the set cement composition and the loading force begins to decrease. The maximum force reached before the pipe moved and the force began to decrease is recorded and used to determine the shear bond strength.

The cement contact area is determined using Equation 5 (EQU. 5), which is subsequently provided in this disclosure.

$$CCA = CCH \times \pi \times D \quad \text{EQU. 5}$$

In EQU. 5, CCA is the cement contact area in inches squared (in$^2$), CCH is the cement contact height on the pipe in inches (in), and D is the diameter of the pipe in inches (in). The diameter D in EQU. 5 will normally be the outside diameter of the inner pipe, however, if movement occurs between the set cement or epoxy resin system and the outer sleeve, the inside diameter of the outer sleeve may also be used calculating the cement contact area. The shear bond strength may then be calculated from Equation 6 (EQU. 6), which is subsequently provided in this disclosure.

$$SBS = \frac{MF}{CCA} \quad \text{EQU. 6}$$

In EQU. 6, SBS is the shear bond strength in pounds per square inch (psi), MF is the maximum force applied to the test specimen in pounds of force (lbf), and CCA is the cement contact area in inches squared calculated from EQU. 5.

Fluid Loss Test

API fluid loss is a test that measures the static filtration behavior of the cement slurry at ambient temperature and 100-psi differential pressure. The fluid loss of the cement compositions may be measured according to test methods provided in the API Recommended Practice For Cementing (RP 10B).

Free Fluid API Test

Free fluid, which is also known as "free water," is the percent volume of fluid that separates from a cement slurry when the slurry is left static. The free fluid can be measured according to test methods provided in the API Recommended Practice For Cementing (RP 10B).

Thickening Time Test

Thickening time is a measurement of the time a cement slurry remains in a fluid state and is capable of being pumped. To assess thickening time, downhole conditions are simulated by plotting the consistency of the slurry over time at the anticipated temperature and pressure conditions. The consistency of the slurry is measured in Bearden Consistency units (Bc), which are a dimensionless quantity on a scale from 1 to 100. At levels greater than 50 Bc, pumping begins to become difficult, and at 100 Bc, the cement slurry is completely set.

EXAMPLES

The following examples illustrate one or more features of the present disclosure. It should be understood that these examples are not intended to limit the scope of the disclosure or the appended claims in any manner. In these Examples, four epoxy resins were evaluated for use in the cement compositions described in the present disclosure. Table 1 provides a cross-reference for the epoxy resins utilized.

TABLE 1

Cross-Reference of Epoxy Resins.

| Epoxy Resin ID | Epoxy Resin Name |
|---|---|
| Resin 1 | bisphenol-A-epichlorohydrin epoxy resin with oxirane mono [($C_{12}$-$C_{14}$)-alkyloxy)methyl] derivatives |
| Resin 2 | 2,3-epoxypropyl-o-tolyl ether |
| Resin 3 | $C_{12}$-$C_{14}$ alkyl glycidyl ether |
| Resin 4 | 1,6-hexanediol diglycidyl ether |

Also, in these Examples, four curing agents were evaluated for use in the cement compositions described in the present disclosure. Table 2 provides the curing agents utilized.

TABLE 2

Cross-Reference of Curing Agents.

| Curing agent | Viscosity | Amine Value | AHEW | Solids % |
|---|---|---|---|---|
| Tetraethylenepentamine (TEPA) | 10-20 | — | 27 | 100 |
| Diethylenetriamine (DETA) | 4 | 1626 | 21 | 100 |
| Triethylenetetramine (TETA) | 20-40 | 1400 | 23 | 100 |
| Isophoronediamine (IPDA) | 15-25 | 650-670 | 40 | 100 |

Example 1

Rheological Properties of Epoxy Resins

Resins 1 through 4 were evaluated for rheological properties according to the test methods previously described in this disclosure. The rheological properties of the four epoxy resins were measured for each resin individually without addition of the curing agent, weighting material, or other additives. The rheological properties measured for Resins 1 through 4 are shown in Table 3.

TABLE 3

Rheological Properties of Resins 1 Through 4.

| Rheological Property | Resin 1 | Resin 2 | Resin 3 | Resin 4 |
|---|---|---|---|---|
| Shear Stress at 600 rpm (lbf/100 ft$^2$) | 385 | 19 | 19.9 | 46 |
| Shear Stress at 300 rpm (lbf/100 ft$^2$) | 384.6 | 10 | 10.3 | 23.5 |
| Shear Stress at 200 rpm (lbf/100 ft$^2$) | 384.4 | 6.5 | 6.6 | 15.4 |
| Shear Stress at 100 rpm (lbf/100 ft$^2$) | 311.5 | 3.3 | 3.5 | 7.7 |
| Shear Stress at 6 rpm (lbf/100 ft$^2$) | 19.1 | 0.2 | 0.2 | 0.3 |
| Shear Stress at 3 rpm (lbf/100 ft$^2$) | 9.6 | 0.2 | 0.2 | 0.2 |
| 10-second Gel Strength (lbf/100 ft$^2$) | 9.5 | 0.1 | 0.2 | 0.2 |

TABLE 3-continued

Rheological Properties of Resins 1 Through 4.

| Rheological Property | Resin 1 | Resin 2 | Resin 3 | Resin 4 |
|---|---|---|---|---|
| 10-Minute Gel Strength (lbf/100 ft$^2$) | 9.4 | 0.1 | 0.1 | 0.1 |
| PV (cP) | 0.4 | 9 | 9.6 | 22.5 |
| YP (lbf/ft$^2$) | 384.2 | 1 | 0.7 | 1 |

As shown in Table 3, Resin 2, Resin 3, and Resin 4 exhibited lesser rheology as shown by the shear stress values of less than 25 lbf/100 ft$^2$ over the range of 3 rpm to 600 rpm for Resins 2, 3, and 4. In contrast, Resin 1 exhibited greater rheology as shown by the increased shear stress values measured over the range of 3 rpm to 600 rpm. Resin 1 also exhibited 10-second and 10-minute gel strengths and yield point that were greater than the 10-second and 10-minute gel strengths and yield point for Resins 2, 3, and 4. As demonstrated by the results in Table 3, the properties of the cement compositions may be adjusted by adding or substituting different epoxy resins.

Example 2

Resin 4 with TEPA Curing Agent

In Example 2, Resin 4 was mixed with different quantities of the curing agent TEPA (tetraethylenepentamine) to evaluate the curing time required for cement compositions comprising Resin 4 and TEPA to change from a liquid phase to a solid or semi-solid phase. A quantity of 100 grams of Resin 4 at 200 degrees Fahrenheit (° F.) (93.3 degrees Celsius (° C.)) was added to each of three containers. Quantities of 3 grams, and 5.5 grams, and 6 grams of TEPA curing agent were added to the 100 grams of Resin 4 in one of each of the three containers, and the contents of each container were thoroughly mixed. The mixtures were heated using a hot roll to maintain the temperatures of the mixtures at 200° F. (93.3° C.). Changes in the color, phase, and hardness of each of the mixtures were observed over time. Observations of phase and hardness are subsequently provided in Table 4. The estimated cure times are provided in units of hours (hrs) and minutes (min) throughout these Examples.

TABLE 4

Observations During Cure Time for Resin 4 with TEPA Curing Agent.

| Sample ID | Quantity of Resin 4(g) | Quantity of TEPA Curing Agent (g) | Observation |
|---|---|---|---|
| 2A | 100 | 3 | Liquid after 8 hrs, semi-solid after a week |
| 2B | 100 | 6 | Semi-solid after 4 hrs 38 min |
| 2C | 100 | 5.5 | Liquid after 8 hrs |

It was observed that each of the mixtures turned darker in color and became thicker in viscosity as time progressed. Each of Samples 2A-2C ultimately cured the epoxy resin system to a solid. As indicated in Table 4, the cure time to cure the mixtures of Resin 4 and TEPA curing agent decreased with increasing quantities of the TEPA curing agent added to Resin 4. Sample 2A having 3 grams of TEPA was liquid after 8 hours and cured to a solid after a week. Sample 2B having 6 grams of TEPA cured to a semi-solid state in 4 hours and 38 minutes. For Sample 2C the amount of TEPA was reduced slightly to 5.5 grams, which resulted in Sample 2C remaining a liquid after 8 hours. Sample 2C eventually cured into a solid epoxy resin system.

Example 3

Resin 4 and IPDA Curing Agent

In Example 3, Resin 4 was mixed with different quantities of IPDA (isophoronediamine) curing agent to evaluate the curing time required for epoxy resin systems comprising Resin 4 and IPDA to change from a liquid phase to a solid or semi-solid phase. A quantity of 100 grams of Resin 4 at 200° F. (93.3° C.) was added to each of six containers. Quantities of 5 grams, 10 grams, 11 grams, 12 grams, 13, grams, and 14 grams of IPDA curing agent were added to the 100 grams of Resin 4 in one of each of the six containers, and the contents of each container were thoroughly mixed. The mixtures were heated using a hot roll to maintain the temperatures of the mixtures at 200° F. (93.3° C.). Changes in the color, phase, and hardness of each of the mixtures were observed over time. Observations of phase and hardness are subsequently provided in Table 4.

TABLE 5

Cure Time Observations for Resin 4 with IPDA Curing Agent.

| Sample ID | Quantity of Resin 4 (g) | Quantity of IPDA Curing Agent (g) | Observation |
|---|---|---|---|
| 3A | 100 | 10 | Liquid after 8 hrs, change in color |
| 3B | 100 | 5 | Liquid after 8 hrs, change in color |
| 3C | 100 | 11 | Liquid after 8 hrs, thickness increases |
| 3D | 100 | 12 | Liquid after 8 hrs, thickness increases |
| 3E | 100 | 13 | Liquid after 8 hrs, thickness increases |
| 3F | 100 | 14 | Liquid after 8 hrs, thickness increases |

For Samples 3A and 3B, the quantities of IPDA curing agent of 10 grams and 5 grams, respectively, were observed to produce a color change in the epoxy resin systems of Samples 3A and 3B after 8 hours. However, the amounts of the IPDA curing agent in Samples 3A and 3B did not produce an observable difference in viscosity of the epoxy resin systems after 8 hours. While the color changes of Samples 3A and 3B indicate the existence of some degree of curing, the amounts of IPDA curing agent in Samples 3A and 3B did not fully cure the epoxy resin systems within a cure time of less than 8 hours. Samples 3A and 3B eventually cured to a solid within a cure time of 24 hours.

For Samples 3C through 3F, the amount of IPDA curing agent was progressively increased from 11 grams in Sample 3C to 14 grams in Sample 3F. Sample 3C having 11 grams of IPDA curing agent per 100 grams of resin exhibited an observable thickening of the epoxy resin systems after 8 hours of cure time. Samples 3D, 3E, and 3F also exhibited thickening of the epoxy resin systems after 8 hours. However, Samples 3C through 3F did not fully cure to a semi-solid or epoxy resin system after 8 hours of cure time. Thus, for an epoxy resin system comprising Resin 4 with IPDA as the curing agent, more than 14 grams of the IPDA curing agent per 100 grams of Resin 4 may be required to cure the epoxy resin system to at least a semi-solid composition in less than 12 hours.

Example 4

Resin 4 and DETA Curing Agent

In Example 4, Resin 4 was mixed with different quantities of DETA (diethylenetriamine) curing agent to evaluate the curing time required for epoxy resin systems comprising Resin 4 and DETA to change from a liquid phase to a solid or semi-solid phase. A quantity of 100 grams of Resin 4 at 200° F. (93.3° C.) was added to each of six containers. Quantities of 3 grams, 5 grams, 7 grams, 7.5 grams, 8 grams, and 9 grams of IPDA curing agent were added to the 100 grams of Resin 4 in one of each of the six containers, and the contents of each container were thoroughly mixed. The mixtures were heated using a hot roll to maintain the temperatures of the mixtures at 200° F. (93.3° C.). Changes in the color, phase, and hardness of each of the mixtures were observed over time. Observations of phase and hardness are subsequently provided in Table 6.

TABLE 6

Observations During Cure Time for Resin 4 with DETA Curing Agent.

| Sample ID | Quantity of Resin 4 (g) | Quantity of DETA Curing Agent (g) | Observation |
| --- | --- | --- | --- |
| 4A | 100 | 3 | Liquid after 8 hrs |
| 4B | 100 | 5 | Liquid after 8 hrs |
| 4C | 100 | 7 | Semi-solid after 6 hrs and 10 min |
| 4D | 100 | 7.5 | Semi-solid after 4 hrs and 50 min |
| 4E | 100 | 8 | Semi-solid after 4 hrs |
| 4F | 100 | 9 | Semi-solid after 3 hrs |

As Samples 4A and 4B having 3 grams and 5 grams of DETA, respectively, were observed to be a liquid after a cure time of 8 hours. Therefore, the amounts of DETA in Samples 4A (3 grams) and 4B (5 grams) did not enable Resin 4 to cure to a semi-solid or solid in less than or equal to 8 hours. Samples 4A and 4B were observed to cure into a solid after a cure time of 24 hours. For Samples 4C-4F, the amounts of DETA added to Resin 4 were progressively increased from 7 grams to 9 grams. Sample 4C having 7 grams of DETA curing agent was observed to cure into a semi-solid composition after 6 hours and 10 minutes. Samples 4D-4F having 7.5 grams, 8 grams, and 9 grams of DETA, respectively, exhibited decreasing cure times to produce the semi-solid composition as the quantity of DETA was increased. Thus, it is observed that an epoxy resin system that includes Resin 4 and DETA as the curing agent may have an amount of DETA curing agent greater than 5 grams per 100 grams of Resin 4, without adding an accelerator. For example, the epoxy resin system may include Resin 4 and greater than or equal to 7 grams DETA curing agent per 100 grams of Resin 4. As the amount of DETA curing agent increases, the curing time decreases.

Example 5

Resin 4 and TETA

In Example 5, Resin 4 was mixed with different quantities of TETA (triethylenetetramine) curing agent to evaluate the curing time required for epoxy resin systems comprising Resin 4 and TETA to change from a liquid phase to a solid or semi-solid phase. A quantity of 100 grams of Resin 4 at 200° F. (93.3° C.) was added to each of five containers. Quantities of 2 grams, 3 grams, 4 grams, 5 grams, and 5.5 grams of TETA curing agent were added to the 100 grams of Resin 4 in one of each of the five containers, and the contents of each container were thoroughly mixed. The mixtures were heated using a hot roll to maintain the temperature of the mixtures at 200° F. (93.3° C.). Changes in the color, phase, and hardness of each of the mixtures were observed over time. Observations of phase and hardness are subsequently provided in Table 7.

TABLE 7

Observations During Cure Time for Resin 4 with TETA Curing Agent

| Sample ID | Quantity of Resin 4 (g) | Quantity of TETA Curing Agent (g) | Observation |
| --- | --- | --- | --- |
| 5A | 100 | 2 | Liquid after 8 hrs, thickness increases |
| 5B | 100 | 3 | Liquid after 8 hrs, thickness increases |
| 5C | 100 | 4 | Liquid after 8 hrs, thickness increases |
| 5D | 100 | 5 | Liquid after 8 hrs, thickness increases |
| 5E | 100 | 5.5 | Semi-solid after 5 hrs and 45 min |

For Samples 5A-5D, the amount of TETA curing agent per 100 grams of Resin 4 was increased from 2 grams to 5 grams. Samples 5A-5D were all liquids after a cure time of 8 hours, but each of Samples 5A-5D exhibited observable thickening of the epoxy resin system comprising Resin 4 and TETA. Samples 5A-5D were observed to cure to a solid after a cure time of more than 12 hours. Sample 5E included 5.5 grams of TETA per 100 grams of Resin 4 and cured to a semi-solid composition after a cure time of 5 hours and 45 minutes. Therefore, it is observed that an epoxy resin system comprising Resin 4 and TETA curing agent may have greater than 5 grams TETA per 100 grams of Resin 4, or greater than or equal to 5.5 grams TETA per 100 grams of Resin 4, for the epoxy resin system to cure to at least a semi-solid composition in less than 8 hours without adding an accelerator.

The combination of Resin 4 and the TETA curing agent of Example 5 resulted in a faster rate of cure of the epoxy resin and a lesser cure time compared to combinations of Resin 4 with TEPA, IPDA, or DETA in Examples 2, 3, and 4, respectively. As previously discussed, the combination of Resin 4 with only 5.5 grams of TETA in Example 5 cured the epoxy resin system to a semi-solid composition in less than 6 hours. In comparison, the epoxy resin system of Example 2, in particular Sample 2C that included Resin 4 and 5.5 grams of TEPA, was still a liquid after 8 hours of curing. For the combination of Resin 4 and TEPA curing agent of Example 2, 6 grams TEPA per 100 grams of Resin 4 resulted in curing Resin 4 to a semi-solid composition in less than 8 hours.

Example 6

Resin 1 and TEPA Curing Agent

In Example 6, Resin 1 was mixed with different quantities of TEPA (tetraethylenepentamine) curing agent to evaluate the curing time required for epoxy resin systems comprising Resin 1 and TEPA to change from a liquid phase to a solid or semi-solid phase. A quantity of 100 grams of Resin 1 at 200° F. (93.3° C.) was added to each of four containers. Quantities of 1 gram, 2 grams, 3 grams, and 3.5 grams of TEPA curing agent were added to the 100 grams of Resin 1 in one of each of the four containers, and the contents of each container were thoroughly mixed. The mixtures were heated using a hot roll to maintain the temperature of the mixtures at 200° F. (93.3° C.). Changes in the color, phase, and hardness of each of the mixtures were observed over time. Observations of phase and hardness are subsequently provided in Table 8.

TABLE 8

Observations During Cure Time for Resin 1 with TEPA Curing Agent

| Sample ID | Quantity of Resin 1 (g) | Quantity of TEPA Curing Agent (g) | Observation |
| --- | --- | --- | --- |
| 6A | 100 | 1 | Color changed, liquid after 6 hrs |
| 6B | 100 | 2 | Color changed, liquid after 8 hrs |
| 6C | 100 | 3 | Color changed, thickness increased after 8 hrs |
| 6D | 100 | 3.5 | Color changed, semi-solid after 4 hrs |

For Samples 6A and 6B, the quantities of TEPA curing agent of 1 gram and 2 grams, respectively, were observed to produce a color change in the epoxy resin systems of Samples 6A and 6B after 6 hours and 8 hours, respectively. While the color change of Samples 6A and 6B indicates the existence of some degree of curing of the Resin 1, the amounts of TEPA curing agent in Samples 6A and 6B did not produce an observable change in viscosity or cure Resin 1 into a semi-solid or solid composition in 8 hours or less. Samples 6A and 6B were observed to cure to a solid after a cure time of 12 hours.

For Sample 6C, the amount of TEPA was increased to 3 grams per 100 grams of Resin 1, which resulted in a change in color as well as an observable increase in the thickness (viscosity) of Resin 1 after a cure time of 8 hours. Increasing the amount of TEPA to 3.5 grams per 100 grams of Resin 1 in Sample 6D resulted in curing Resin 1 to a semi-solid composition after a cure time of 4 hours.

Example 7

Resin 1 and DETA Curing Agent

In Example 7, Resin 1 was mixed with different quantities of DETA (diethylenetriamine) curing agent to evaluate the curing time required for epoxy resin systems comprising Resin 1 and DETA to change from a liquid phase to a solid or semi-solid phase. A quantity of 100 grams of Resin 1 at 200° F. (93.3° C.) was added to each of three containers. Quantities of 3 grams, 5 grams, and 7 grams of DETA curing agent were added to the 100 grams of Resin 1 in one of each of the three containers, and the contents of each container were thoroughly mixed. The mixtures were heated using a hot roll to maintain the temperature of the mixtures at 200° F. (93.3° C.). Changes in the color, phase, and hardness of each of the mixtures were observed over time. Observations of phase and hardness are subsequently provided in Table 9.

TABLE 9

Observations During Cure Time for Resin 1 with DETA Curing Agent

| Sample ID | Quantity of Resin 1 (g) | Quantity of DETA Curing Agent (g) | Observation |
| --- | --- | --- | --- |
| 7A | 100 | 3 | Semi-solid after 6 hrs and 20 min |
| 7B | 100 | 5 | Semi-solid after 2 hrs and 15 min, solid after 24 hrs |
| 7C | 100 | 7 | Semi-solid after 1 hr and 10 min, solid after 8 hrs |

In Sample 7A, the combination of 100 grams of Resin 1 with 3 grams of DETA curing agent was observed to cure Resin 1 to a semi-solid composition after 6 hours and 20 minutes and to a solid after a cure time of 8 hours. As the amount of DETA curing agent is increased to 5 grams DETA per 100 grams of Resin 1 in Sample 7B and 7 grams DETA per 100 grams of Resin 1 in Sample 7C, the cure time needed to cure Resin 1 to a solid decreased. As shown in the results for Sample 7A, an epoxy resin system that includes Resin 1 and DETA curing agent may need less than 5 grams of DETA, or even as little as 3 grams of DETA, to cure the epoxy resin system within a cure time of less than 12 hours, or even less than 8 hours, without including an accelerator.

Examples 8-11

Resin 2 and Various Curing Agents

In Examples 8-11, Resin 2 was mixed with different quantities of DETA (diethylenetriamine), TETA (triethylenetetramine), TEPA (tetraethylenepentamine), IPDA (isophoronediamine) curing agents to evaluate the curing time required for the various epoxy resin systems to change from a liquid phase to a solid or semi-solid phase. For Example 8, a quantity of 100 grams of Resin 2 at 200° F. (93.3° C.) was added to each of two containers. Quantities of 7 grams and 9 grams of DETA curing agent were added to the 100 grams of Resin 2 to each of the two containers, respectively. For Example 9, a quantity of 100 grams of Resin 2 at 200° F. (93.3° C.) was added to each of three containers. Quantities of 5.5 grams, 6 grams, and 8 grams of TETA curing agent were added to the 100 grams of Resin 2 to each of the three containers, respectively. For Example 10, a quantity of 100 grams of Resin 2 at 200° F. (93.3° C.) was added to each of two containers. Quantities of 15 grams and 20 grams of IPDA curing agent were added to the 100 grams of Resin 2 to each of the two containers, respectively. For Example 11, a quantity of 100 grams of Resin 2 at 200° F. (93.3° C.) was added to each of two containers. Quantities of 7 grams and 10 grams of TEPA curing agent were added to the 100 grams of Resin 2 to each of the two containers, respectively.

The contents of each container of Examples 8-11 were thoroughly mixed. The mixtures of Examples 8-11 were heated using a hot roll to maintain the temperature of the mixtures at 200° F. (93.3° C.). Changes in the color, phase, and hardness of each of the mixtures of Examples 8-11 were observed over time. Observations of phase and hardness for Examples 8-11 are subsequently provided in Table 10.

TABLE 9

Observations During Cure Time for Resin 2 with DETA (Example 8), TETA (Example 9), IPDA (Example 10), and TEPA (Example 11)

| Sample ID | Resin | Curing agent | Quantity of Resin 2 (g) | Quantity of Curing Agent (g) | Observation |
|---|---|---|---|---|---|
| 8A | Resin 2 | DETA | 100 | 7 | Liquid after 8 hrs |
| 8B | Resin 2 | DETA | 100 | 9 | Liquid after 8 hrs |
| 9A | Resin 2 | TETA | 100 | 6 | Liquid after 8 hrs |
| 9B | Resin 2 | TETA | 100 | 5.5 | Liquid after 8 hrs |
| 9C | Resin 2 | TETA | 100 | 8 | Liquid after 8 hrs |
| 10A | Resin 2 | IPDA | 100 | 20 | Liquid after 8 hrs |

TABLE 9-continued

Observations During Cure Time for Resin 2 with DETA (Example 8), TETA (Example 9), IPDA (Example 10), and TEPA (Example 11)

| Sample ID | Resin | Curing agent | Quantity of Resin 2 (g) | Quantity of Curing Agent (g) | Observation |
|---|---|---|---|---|---|
| 10B | Resin 2 | IPDA | 100 | 15 | Liquid after 8 hrs |
| 11A | Resin 2 | TEPA | 100 | 10 | Liquid after 8 hrs |
| 11B | Resin 2 | TEPA | 100 | 7 | Liquid after 8 hrs |

The compositions of Examples 8-11 cured to solid epoxy resin systems following additional cure time beyond eight hours. However, the compositions of Examples 8-11 that included Resin 2 included greater quantities of the curing agent to cure to a semi-solid state compared to the epoxy resin systems of Examples 1-7 that included Resin 1 or Resin 4.

Examples 12

Comparison of Resin 1 to a Mixture of Resin 1 and Resin 4

For Example 12, an epoxy resin system that included Resin 1 and TEPA curing agent was compared to an epoxy resin system that included a mixture of Resin 1 and Resin 4 with TEPA curing agent. For Sample 12A, 100 grams of Resin 1 at 200° F. (93.3° C.) was added to a container. 10 grams of TEPA curing agent and 24.63 grams of a weighting agent were added to the 100 grams of Resin 1 in the container. The weighting agent was manganese oxide ($Mn_3O_4$) and was added to adjust the density of Sample 12A to a measured density of 80 pounds per cubic foot (pcf). For Sample 12B, 80 grams of Resin 1 and 20 grams of Resin 4 at 200° F. (93.3° C.) were added to a container. 10 grams of TEPA curing agent was added to the mixture of Resin 1 and Resin 2 in the container. An amount of $Mn_3O_4$ weighting agent was added to adjust the density of Sample 12B to 80 pcf. A total amount of $Mn_3O_4$ added to Sample 12B was 26.10 grams.

The mixtures of Samples 12A and 12B were thoroughly mixed. The mixtures of Samples 12A and 12B were heated using a hot roll to maintain the temperature of the mixtures at 200° F. (93.3° C.). The elapsed time needed for each of Samples 12A and 12B to turn from a liquid to a semi-solid was measured. Changes in the color, phase, and hardness of each of the mixtures were observed over time. The cure time to a semi-solid material and observations of phase and hardness for Samples 12A and 12B are subsequently provided in Table 10.

TABLE 10

Observations During Cure Time for Resin 1 with TEPA Curing Agent Compared to a Mixture of Resin 1 and Resin 4 with TEPA Curing Agent.

| Sample ID | Quantity of Resin 1 (g) | Quantity of Resin 4 (g) | Quantity of TEPA (g) | Calculated Density (pcf) | Time to Semi-solid State (min) | Observations |
|---|---|---|---|---|---|---|
| 12A | 100 | 0 | 10 | 68.6 | 80 | The mixture became solid after 1 hr and 40 min |
| 12B | 80 | 20 | 10 | 68.0 | 70 | The mixture became solid after 2 hrs and 30 min |

As shown in Table 10, both Sample 12A and Sample 12B cured to a semi-solid state in less than 40 minutes. The replacement of 20 grams of Resin 1 with 20 grams of Resin 4 in Sample 12B slightly decreased the curing rate, resulting in a slightly increased cure time compared to Sample 12A, which included only Resin 1. Thus, the cure time may be adjusted by combining an amount of Resin 4 with Resin 1 in the epoxy resin system.

Example 13

Curing Time for Epoxy Resin Systems Comprising Mixtures of Resin 1 and Resin 4 with DETA Curing Agent For Example 13, epoxy resin systems comprising various mixtures of Resin 1 and Resin 2 were evaluated with different amounts of DETA curing agent. For Samples 13A, 13B, and 13C, 80 grams of Resin 1 and 20 grams of Resin 4 at 200° F. (93.3° C.) were added to each of three containers. Quantities of 7 grams, 5 grams, and 3 grams of DETA curing agent were added to each of the three containers, respectively. For Samples 13D and 13E, 50 grams of Resin 1 and 50 grams of Resin 4 at 200° F. (93.3° C.) were added to each of two containers. Quantities of 7 grams and 5 grams of DETA curing agent were added to each of the two containers, respectively. For Samples 13F, 13G, and 13H, 30 grams of Resin 1 and 70 grams of Resin 4 at 200° F. (93.3° C.) were added to each of three containers. Quantities of 7 grams, 5 grams, and 3 grams of DETA curing agent were added to each of the three containers, respectively.

The mixtures of Samples 13A-13H were thoroughly mixed. The mixtures of Samples 13A-13H were heated using a hot roll to maintain the temperature of the mixtures at 200° F. (93.3° C.). The elapsed time needed for each of Samples 13A-13H to turn from a liquid to a semi-solid was measured in minutes (min). Changes in the color, phase, and hardness of each of the mixtures were observed over time. The cure time to a semi-solid material and observations of phase and hardness for Samples 13A-13H are subsequently provided in Table 11.

TABLE 11

Observations During Cure Time for Various Mixtures of Resin 1 and Resin 4 with DETA Curing Agent.

| Sample ID | Quantity of Resin 1 (g) | Quantity of Resin 4 (g) | Quantity of DETA (g) | Time to Semi-solid State (min) | Observations |
|---|---|---|---|---|---|
| 13A | 80 | 20 | 7 | 72 | Semi-solid after 1 hr and 12 min, solid after 8 hrs |
| 13B | 80 | 20 | 5 | 120 | Semi-solid after 2 hrs, solid after 24 hrs |
| 13C | 80 | 20 | 3 | 385 | Semi-solid after 6 hrs and 25 min |
| 13D | 50 | 50 | 7 | 130 | Semi-solid after 2 hr and 10 min |
| 13E | 50 | 50 | 5 | 260 | Semi-solid after 4 hrs and 20 min, solid after 24 hrs |
| 13F | 30 | 70 | 7 | 170 | Semi-solid after 2 hrs and 50 min, solid after 8 hrs |
| 13G | 30 | 70 | 5 | 170 | Semi-solid after 2 hrs and 50 min, solid after 24 hrs |
| 13H | 30 | 70 | 3 | 480+ | Liquid after 8 hrs |

As shown in Table 11, the curing time increases as the weight ratio of Resin 1 to Resin 4 decreases. As previously observed, the cure times increase with increasing quantities of the curing agent. Samples 13C, 13E, and 13H had curing times to transition from a liquid to a semi-solid of greater than 4 hours.

Comparative Example 14

Comparative Wellbore Cement without the Epoxy Resin System

In Comparative Example 14, two samples of a wellbore cement without an epoxy resin system were prepared. The comparative wellbore cement included Portland cement, silica, a weighting agent, an expanding additive, a defoamer, a latex additive and latex stabilizer, a fluid loss additive, a cement friction reducer, a cement retarder, and water. The formulation for the wellbore cement without an epoxy resin system of Comparative Example 14 is shown in Table 12, which is subsequently provided in this disclosure. Samples 14A and 14B were prepared using the same formulation. The comparative cements of Samples 14A and 14B were 160 pounds per cubic foot (lbm/ft$^3$) (2563 kilograms per cubic meter (kg/m$^3$), where 1 lbm/ft$^3$ is equal to 119.8 kg/m$^3$).

Example 15

Cement Composition Including the Epoxy Resin System

In Example 15, a cement composition according to the present disclosure was prepared by replacing the latex and latex stabilizer of the cement of Comparative Example 14 with the epoxy resin system and adjusting the formulation to achieve a density comparable to the comparative wellbore cement of Comparative Example 14. The epoxy resin in the cement composition of Example 15 was bisphenyl-A-epichlorohydrin epoxy resin, and the curing agent was diethyl toluene diamine (DETDA). The formulation for the cement composition of Example 15 is shown in Table 12, subsequently provided in this disclosure.

TABLE 12

Formulations for the conventional cement compositions of Comparative Example 14 and for the cement composition of Example 15. All weights in Table 12 are provided in grams (g).

| Component | 14A | 14B | 15A | 15B |
|---|---|---|---|---|
| Class G Cement (g) | 481.01 | 481.01 | 461.07 | 461.07 |
| Silica powder (g) | 168.35 | 168.35 | 193.65 | 193.65 |
| Weighting materials (g) | 625.32 | 625.32 | 599.40 | 599.40 |
| Expanding additive (g) | 4.81 | 4.81 | 13.83 | 13.83 |
| Defoamer (g) | 1.18 | 1.18 | 1.13 | 1.13 |
| Latex additive (g) | 42.58 | 42.58 | — | — |
| Latex stabilizer (g) | 9.05 | 9.05 | — | — |
| Fluid loss additive (g) | 0.48 | 0.48 | 1.84 | 1.84 |
| Cement friction reducer (g) | 3.85 | 3.85 | 4.61 | 4.61 |
| Cement retarder (g) | 5.29 | 5.29 | 4.97 | 4.97 |
| Epoxy resin (g) | — | — | 34.58 | 34.58 |
| Curing agent (g) | — | — | 9.34 | 9.34 |
| Water (g) | 195.85 | 195.85 | 203.27 | 203.27 |
| Total (g) | 1537.77 | 1537.77 | 1527.69 | 1527.69 |
| Density (lbm/ft$^3$) | 160 | 160 | 159 | 159 |

Example 16

Evaluation of the Impact of Adding Epoxy Resin System on Elasticity, Compressive Strength, and Bond Strength of the Cement Composition The comparative wellbore cements of Comparative Example 14 and the cement compositions of Example 15 were evaluated for compressive strength and bond strength according to the shear bond test previously described in this disclosure. The results for the compressive strength and shear bond strength of the cements of Comparative Example 14 and the cement compositions of Example 15 are provided subsequently in this disclosure in Table 13.

TABLE 13

Comparison of Compressive Strength and Shear Bond Strength for the Cements of Comparative Example 15 and the Cement Compositions of Example 16.

| Sample No. | Cement Contact Height on Pipe (in) | Inside Diameter of Outside Pipe (in) | Cement Contact Area (in$^2$) | Maximum Force Applied to Sample (lbf) | Shear Bond Strength (psi) |
|---|---|---|---|---|---|
| 14A | 3.99 | 2.5 | 31.32 | 11250 | 359 |
| 14B | 3.88 | 2.5 | 30.45 | 12190 | 400 |
| 15A | 3.81 | 2.5 | 29.90 | 14230 | 476 |
| 16B | 3.93 | 2.5 | 30.85 | 16700 | 541 |

As shown in Table 13, the cement compositions of Example 15 having the epoxy resin system added (for example, average of Samples 15A and 15B) exhibited an average bond strength of 509 psi, which was significantly greater than the average bond strength of 378 psi for the comparative wellbore cements of Comparative Example 14 (for example, average of Samples 14A and 14B). Additionally, the cement compositions of Example 15 having the epoxy resin system added (for example, Samples 15A and 15B) were able to withstand a greater amount of force (for example, average of 15,465 lbf) applied to the cement compositions compared to the comparative wellbore cements of Comparative Example 14 (for example, Samples 14A and 14B), which were subjected to an average of 11,720 psi. Thus, the cement compositions having the epoxy resin system according to embodiments of the present disclosure are shown to exhibit greater compressive strength and the shear bond strength compared to the comparative wellbore cements.

The comparative wellbore cements of Comparative Example 14 and the cement compositions of Example 15 were also evaluated for bulk modulus. The cement compositions of Example 15 having the epoxy resin system added (for example, Samples 15A and 15B) exhibited a bulk modulus of about 1,184,000 psi, which was less than the static bulk modulus of 1,404,000 psi determined for the comparative wellbore cements of Comparative Example 14 (for example, Samples 14A and 14B). Lesser bulk modulus indicates that the material exhibits greater elasticity. Thus, it has been shown in Example 16 that the cement compositions of Example 15 having the epoxy resin system added exhibited greater elasticity compared to the wellbore cements of comparative Example 14.

Example 17

Cement Composition Having the Epoxy Resin System and Density of 140 pcf

In Example 17, a cement composition having the epoxy resin system was formulated to have a density of 140 pcf. The formulation for the cement composition of Example 17 is provided subsequently in Table 14.

TABLE 14

Cement Slurry with Density of 140 pcf.

| Component | Concentration | Unit of Measurement |
|---|---|---|
| Class G Cement | 100 | Percent By Weight of Cement (% BWOC) |
| Water | 40.06 | L/100 kg |
| Silica flour | 28 | % BWOC |
| Silica Sand | 12 | % BWOC |
| Expansion Additive | 3 | % BWOC |
| Hematite | 25 | % BWOC |
| Mn$_3$O$_4$ | 25 | % BWOC |
| Fluid Loss Additive | 0.15 | % BWOC |
| Dispersant | 0.5 | % BWOC |
| Retarder 1 | 1.2 | % BWOC |
| Retarder 2 | 0.15 | % BWOC |
| Defoamer | 0.03 | gps |
| Bisphenyl-A-epichlorohydrin epoxy resin | 0.853 | gps |
| Diethyl toluene diamine | 0.257 | gps |

Example 18

Cement Composition Having the Epoxy Resin System and a Density of 125 pcf

In Example 18, a cement composition having the epoxy resin system was formulated to have a density of 125 pcf. The formulation for the cement composition of Example 18 is provided subsequently in Table 15.

TABLE 15

Cement Slurry with Density of 125 pcf.

| Component | Concentration | Unit of Measurement |
|---|---|---|
| Class G Cement | 100 | Percent By Weight of Cement (% BWOC) |
| Water | 2.75 | gps |
| Silica | 35 | % BWOC |
| Expansion Additive | 1 | % BWOC |
| Defoamer | 0.03 | gps |
| Fluid Loss Additive | 0.1 | % BWOC |
| Stabilizer | 0.3 | gps |
| Latex | 1.5 | gps |
| Dispersant | 0.5 | % BWOC |
| Retarder 1 | 0.9 | % BWOC |
| Retarder 2 | 0.4 | % BWOC |
| Bisphenyl-A-epichlorohydrin epoxy resin | 0.71 | gps |
| Diethyl toluene diamine | 0.21 | gps |

Example 19

Evaluation of Cement Compositions of Examples 17 and 18

The cement compositions of Examples 17 and Example 18 were evaluated for rheological properties, fluid loss, free fluid properties, thickening time, and compressive strength according to the test methods previously described in this disclosure. These results are provided subsequently in this disclosure in Table 16.

TABLE 16

Evaluation of Characteristics of the Cement Compositions of Examples 17 and 18.

| | Cement slurry with a density of 140 | Cement slurry with a density of 125 |
|---|---|---|
| Rheology | | |
| Temperature (° F.) | 181 | 181 |
| 600 rpm | 289 | — |
| 300 rpm | 160 | 215 |
| 200 rpm | 114 | 150 |
| 100 rpm | 63 | 95 |
| 60 rpm | 49 | 78 |
| 30 rpm | 31 | 49 |
| 6 rpm | 14 | 20 |
| 3 rpm | 11 | — |
| PV | 148 | 192 |
| YP | 15 | 26 |
| Fluid Loss Test | | |
| Temperature (° C.) | 83 | 83 |
| Pressure (psi/kPa) | 1000/6895 | 1000/6895 |
| Test Time (min) | 30 | 30 |
| API Fluid Loss (cm³/min) | 50 | 40 |
| Free Fluid API Test | | |
| Inclination (degrees) | 0 | 0 |
| Conditioning Time (min) | 30 | 30 |
| Static Time (min) | 120 | 120 |
| % Free Fluid | 0 | 0 |
| Thickening Time Test | | |
| Temperature (° C.) | 83 | 83 |
| Pressure (psi/kPa) | 8000/55158 | 8000/55158 |
| Batch Mix (min) | 90 | 90 |
| 40 Bc (hh:mm) | 6:20 | 9:55 |
| 50 Bc (hh:mm) | 6:21 | 11:05 |
| UCA Compressive Strength | | |
| End Temperature (° C.) | 107 | — |
| Pressure (psi/kPa) | 3000/20684 | — |
| 50 psi (hh:mm) | 24.36 | — |
| 500 psi (hh:mm) | 27.05 | — |

As shown in Table 16, the cement compositions of Example 17 having the epoxy resin system exhibited a plastic viscosity and yield point of 148 and 15, respectively. Also, the cement compositions of Example 18 having the epoxy resin system exhibited a plastic viscosity and yield point of 192 and 26, respectively. For both Examples 17 and 18, these rheological properties show that the cement compositions with epoxy resin systems have the ability to carry solids, which will not settle in the cement.

Also as shown in Table 16, the cement compositions of Examples 17 and 18 having the epoxy resin system exhibited an API fluid loss over 50 cm³/min and 40 cm³/min, respectively when tested at 83° C., 1000/6895 psi/kPa, and 30 minutes. As shown in Table 16, the % free fluid of both Examples 17 and 18 were also 0% when tested at the same conditions. Therefore, the results show that the two cement compositions having different had comparable fluid loss and free fluid properties. Therefore, the cement compositions with epoxy resin systems provide consistent results in fluid loss control even at different densities.

The thickening time results for Examples 17 and 18 are also provided in Table 16. For Example 17, which has a greater density, the thickening time was about 6 hours and 20 minutes at both 40 Bc and 50 Bc. Additionally, for Example 18, the thickening time was about 10 hours at 40 Bc and 11 hours at 50 Bc. The differences in thickening time correspond to the differences in density. These results again indicate that the cement compositions with epoxy resin systems provide consistent properties even at different densities, which allows for good control and zonal isolation.

Finally, as shown in Table 16, the cement compositions of Example 17 having the epoxy resin system exhibited a compressive strength of 24 hours and 36 minutes at 50 psi and 27 hours and 5 minutes at 500 psi. These results indicate that at different pressures, the cement compositions with epoxy resin systems provide consistent compressive strength.

Comparative Example 20

Comparative Epoxy Resin System

In Comparative Example 20, a comparative epoxy resin system was prepared using a mixture of a resin including cyclohexanedimethanol diglydicyl ether, a resin including butyl glycidyl ether, and diethyl toluene diamine (DETDA) as the curing agent. The of each constituent in the epoxy resin system of Comparative Example 20 are shown subsequently in Table 17.

TABLE 17

Epoxy Resin System of Comparative Example 20.

| Additives | Concentration |
|---|---|
| Resin with cyclohexanedimethanol diglydicyl ether | 160.43 g |
| Resin with butyl glycidyl ether | 53.10 g |
| DETDA | 61.77 g |

Example 21

Epoxy Resin System

In Example 21, the epoxy resin system of the present disclosure was prepared using a mixture that included bisphenyl-A-epichlorohydrin epoxy resin and butyl glycidyl ether resin, and diethyl toluene diamine (DETDA) as the curing agent. The formulation for the epoxy resin system of Example 21 is shown in Table 18, subsequently provided in this disclosure.

TABLE 18

Epoxy Resin System of Example 21

| Additives | Concentration |
|---|---|
| bisphenyl-A-epichlorohydrin epoxy resin (Razeen LR 2254) | 160 g |
| butyl glycidyl ether resin (Razeen D 7106) | 40 g |
| DETDA curing agent (Razeencure 931) | 9.2 g |

Example 22

Comparison of Epoxy Resin Systems

The epoxy resin systems of Comparative Example 20 and Example 21 were evaluated at room temperature for rheological properties according to the test methods previously described in this disclosure. The results are provided subsequently in this disclosure in Table 19.

TABLE 19

Rheology of the Epoxy Resin Systems for Comparative
Example 20 and Example 21 at Room Temperature.

|  | Comparative Example 20 | Example 21 |
|---|---|---|
| 600 rpm | Over range | Over range |
| 300 rpm | Over range | 164 |
| 200 rpm | 221 | 111 |
| 100 rpm | 124 | 56 |
| 6 rpm | 7 | 3 |
| 3 rpm | 4 | 1 |
| PV | — | — |
| YP | — | — |
| 10 sec gel | 4 | 1 |
| 10 min gel | 4 | 2 |

As shown in Table 19, the gel strength of the epoxy resin system of Example 21 is less than the gel strength of the differing epoxy resin system of Example 20. The lesser viscosity of Example 21 may allow a cement composition that includes the epoxy resin system of Example 21 to penetrate deeper into the formation and for improved wellbore isolation compared to wellbore cements that include the comparative epoxy resin system of Comparative Example 20.

Comparative Example 23

Comparative Wellbore Cement

In Example 23, a comparative wellbore cement with the comparative epoxy resin system was prepared. The comparative cement had a density of 145 pcf and included Portland cement, silica, an expansion additive, a weighting agent, hematite, a fluid loss additive, a dispersant, retarders, a defoamer, a stabilizer, and the comparative epoxy resin system. The formulation for the comparative wellbore cement with the comparative epoxy resin system of Comparative Example 20 is shown in Table 20, which is subsequently provided in this disclosure.

TABLE 20

Comparative Wellbore Cement of Comparative Example
23 with the Comparative Epoxy Resin System.

| Component | Concentration | Unit of Measurement |
|---|---|---|
| Class G Cement | 100 | (% BWOC) |
| Water | 36.84 | L/100 kg |
| Silica flour | 12 | % BWOC |
| Silica Sand | 30 | % BWOC |
| Expansion Additive | 3 | % BWOC |
| Hematite | 32 | % BWOC |
| Weight Additive | 32 | % BWOC |
| Fluid Loss Additive | 0.15 | % BWOC |
| Dispersant | 0.5 | % BWOC |
| Retarder 1 | 2 | % BWOC |
| Retarder 2 | 0.2 | % BWOC |
| Defoamer | 0.03 | gps |
| Stabilizer | 0.2 | gps |
| Epoxy Resin | 7.5 | gps |
| Aliphatic Amine Curing Agent | 2 | gps |

Example 24

Comparison of Rheological Properties of the
Wellbore Cement of Comparative Example 23 with
the Cement Composition of Example 17

The wellbore cement of Comparative Example 23 and the cement composition of Example 17 were compared to evaluate their rheological properties according to the test methods previously described in this disclosure. The rheological properties of Comparative Example 23 and Example 17 are provided subsequently in this disclosure in Table 21.

TABLE 21

Rheology of the Cement Compositions with Epoxy Resin Systems.

|  | Comparative Example 23 (at 82.8° C.) | Example 17 (at 87.8° C.) |
|---|---|---|
| 600 rpm | — | 289 |
| 300 rpm | 111 | 160 |
| 200 rpm | 89 | 114 |
| 100 rpm | 51 | 63 |
| 6 rpm | 11 | 14 |
| 3 rpm | 8 | 11 |
| PV | 106.33 | 148 |
| YP | 11.17 | 15 |

Based on the results provided in Table 21, the rheological properties of the comparative wellbore cement of Comparative Example 23 are less than the cement compositions of Example 17. The YP (yield Point), which is the ability of fluid to carry solids, of the wellbore cement of Comparative Example 23 was 15 compared to 11.17 for the cement composition of Example 17. At 3 rpm a gel strength greater than 6 indicates that solids will not settle in the cement. The wellbore cement of Comparative Example 23 had a gel strength of 8 at 3 rpm, but the cement composition of Example 17 had a superior gel strength of 11. Therefore, this indicates that solids are less likely to settle in the cement compositions having the disclosed epoxy resin system, such as the cement compositions of Example 17, but the greater gel strength also allows for deeper penetration and improved wellbore isolation when mixed with a cement slurry.

Example 25

Evaluation of the Aging Properties of the Epoxy
Resin Systems

The epoxy resin system of Example 21 was evaluated for aging properties after curing the epoxy resin system. A sample of the epoxy resin system of Example 21 after curing was weighed and subsequently heated at approximately 121.11° C. (250° F.) for 24 hours. The sample of the epoxy resin system of Example 21 was weighted again after heating. These results are provided in Table 21.

TABLE 22

Aging Test Results for Epoxy Resin System of Example 21

| Weight of Sample Before Heating | 39.08 g |
|---|---|
| Weight of Sample After Heating | 39.08 g |

As provided in Table 22, the weight of the sample of the epoxy resin system of Example 21 was 39.08 grams both before and after heating. Because no weight loss was observed after heating, this indicates desirable aging properties of a cement composition that includes the epoxy resin system of Example 21.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method comprising
   introducing a cement composition into a lost circulation zone of a wellbore, the cement composition comprising:
   a cement slurry having a density in a range of from 125 pounds per cubic feet ("pcf") to 180 pcf, the cement slurry comprising:
   Portland Cement,
   silica sand in an amount of from 10% to 20% by weight of cement,
   silica flour in an amount of from 5% to 30% by weight of cement,
   hematite in an amount of from 30% to 50% by weight of cement, and
   manganese tetraoxide in an amount of from 30% to 50% by weight of cement; and
   an epoxy resin system comprising:
   at least one of 2,3-epoxypropyl o-tolyl ether, alkyl glycidyl ethers having from 12 to 14 carbon atoms, bisphenol-A-epichlorohydrin epoxy resin, or a compound having formula (I):

$$(OC_2H_3)-CH_2-O-R^1-O-CH_2-(C_2H_3O) \quad (I)$$

where $R^1$ is a linear or branched hydrocarbyl having from 4 to 24 carbon atoms; and
   a curing agent comprising diethylenetriamine, triethylenetetramine, tetraethylenepentamine, isophoronediamine, or combinations thereof;
   curing the cement composition to form a cured cement composition, where the cured cement composition seals the lost circulation zone, and
   subjecting the cured cement composition to temperature and pressure cycling, wherein the cured cement composition resists the formation of micro-cracks.

2. The method of claim 1, where introducing the cement composition to the lost circulation zone comprises injecting the cement composition into the lost circulation zone.

3. The method of claim 1, where the lost circulation zone is a narrow fracture gradient zone.

4. The method of claim 1, further comprising drilling through the cured cement composition sealing the lost circulation zone to continue drilling the wellbore.

5. The method of claim 1, where a spacer fluid, the cement composition, or both are introduced into the lost circulation zone through a drill string disposed within the wellbore.

6. The method of claim 1, further comprising introducing a displacement fluid after the cement composition to displace the cement composition into the lost circulation zone.

7. The method of claim 1, where the cement composition has a cure time of less than or equal to 48 hours.

8. The method of claim 1, wherein the epoxy resin system comprises from 40 wt. % to 99 wt. % of the 2,3-epoxypropyl o-tolyl ether, based on the total weight of the epoxy resin system.

9. The method of claim 1, wherein the epoxy resin system comprises from 40 wt. % to 99 wt. % of the alkyl glycidyl ethers having from 12 to 14 carbon atoms, based on the total weight of the epoxy resin system.

10. The method of claim 1, wherein the epoxy resin system comprises from 40 wt. % to 99 wt. %, based on the total weight of the epoxy resin system, of the compound having formula (I):

$$(OC_2H_3)-CH_2-O-R^1-O-CH_2-(C_2H_3O) \quad (I)$$

where $R^1$ is a linear or branched hydrocarbyl having from 4 to 24 carbon atoms.

11. The method of claim 1, wherein the epoxy resin system comprises from 40 wt. % to 99 wt. % 1,6-hexanediol ether, based on the total weight of the epoxy resin system.

12. A method comprising
    introducing a cement composition into an annulus of a wellbore, the cement composition comprising:
    a cement slurry having a density in a range of from 125 pounds per cubic feet ("pcf") to 180 pcf, the cement slurry comprising:
    Portland Cement,
    silica sand in an amount of from 10% to 20% by weight of cement, silica flour in an amount of from 5% to 30% by weight of cement, hematite in an amount of from 30% to 50% by weight of cement, and manganese tetraoxide in an amount of from 30% to 50% by weight of cement; and an epoxy resin system comprising:

at least one of 2,3-epoxypropyl o-tolyl ether, alkyl glycidyl ethers having from 12 to 14 carbon atoms, bisphenol-A-epichlorohydrin epoxy resin, or a compound having formula (I):

$$(OC_2H_3)-CH_2-O-R^1-O-CH_2-(C_2H_3O) \qquad (I)$$

where $R^1$ is a linear or branched hydrocarbyl having from 4 to 24 carbon atoms; and a curing agent comprising diethylenetriamine, triethylenetetramine, tetraethylenepentamine, isophoronediamine, or combinations thereof;

curing the cement composition to form a cured cement composition, where the cured cement composition seals the annulus; and subjecting the cured cement composition to temperature and pressure cycling, wherein the cured cement composition resists the formation of micro-cracks.

13. The method of claim 12, where introducing the cement composition into the annulus comprises introducing the cement composition into a portion of the wellbore experiencing casing-casing annulus pressure increase.

14. The method of claim 12, where introducing the cement composition into the annulus comprises introducing the cement composition into one or more sections of the annulus comprising micro-cracks.

15. The method of claim 12, where introducing the cement composition comprises introducing the cement composition to the wellbore through a drill string.

16. The method of claim 12, where the cement composition has a cure time of less than or equal to 48 hours.

17. A method for repairing a weak zone in a hydrocarbon production well, the method comprising:

perforating at least one tubular string in the weak zone of the hydrocarbon production well;

injecting a cement composition through the tubular string and into the weak zone of the hydrocarbon production well, the cement composition comprising:

a cement slurry having a density in a range of from 125 pounds per cubic feet ("pcf") to 180 pcf, the cement slurry comprising:

Portland Cement, silica sand in an amount of from 10% to 20% by weight of cement, silica flour in an amount of from 5% to 30% by weight of cement, hematite in an amount of from 30% to 50% by weight of cement, and manganese tetraoxide in an amount of from 30% to 50% by weight of cement; and an epoxy resin system comprising:

at least one of 2,3-epoxypropyl o-tolyl ether, alkyl glycidyl ethers having from 12 to 14 carbon atoms, bisphenol-A-epichlorohydrin epoxy resin, or a compound having formula (I):

$$(OC_2H_3)-CH_2-O-R^1-O-CH_2-(C_2H_3O) \qquad (I)$$

where $R^1$ is a linear or branched hydrocarbyl having from 4 to 24 carbon atoms; and a curing agent comprising diethylenetriamine, triethylenetetramine, tetraethylenepentamine, isophoronediamine, or combinations thereof;

curing the cement composition to form a cured cement composition; and subjecting the cured cement composition to temperature and pressure cycling, wherein the cured cement composition resists the formation of micro-cracks.

18. The method of claim 17 further comprising identifying a weak zone of a cement sheath of the hydrocarbon production well.

* * * * *